United States Patent [19]
Cheong et al.

[11] Patent Number: 6,098,167
[45] Date of Patent: *Aug. 1, 2000

[54] APPARATUS AND METHOD FOR FAST UNIFIED INTERRUPT RECOVERY AND BRANCH RECOVERY IN PROCESSORS SUPPORTING OUT-OF-ORDER EXECUTION

[75] Inventors: Hoichi Cheong; Hung Qui Le; John Stephen Muhich; Steven Wayne White, all of Austin, Tex.

[73] Assignee: International Business Machines Corporation, Armonk, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/829,667

[22] Filed: Mar. 31, 1997

[51] Int. Cl.[7] .................................................. G06F 9/46
[52] U.S. Cl. .......................... 712/218; 712/217; 712/228
[58] Field of Search .................................... 395/569, 393, 395/394, 182.13; 712/228, 217, 218; 714/37

[56] References Cited

U.S. PATENT DOCUMENTS

| | | |
|---|---|---|
| 4,870,614 | 9/1989 | Quatse . |
| 4,965,721 | 10/1990 | Holtey et al. . |
| 5,057,997 | 10/1991 | Chang et al. . |
| 5,301,312 | 4/1994 | Christopher, Jr. et al. . |
| 5,307,495 | 4/1994 | Seino et al. . |
| 5,335,331 | 8/1994 | Murao et al. . |
| 5,355,460 | 10/1994 | Eickemeyer et al. . |
| 5,361,356 | 11/1994 | Clark et al. . |
| 5,390,311 | 2/1995 | Fu et al. . |
| 5,404,558 | 4/1995 | Okamoto . |
| 5,440,703 | 8/1995 | Ray et al. . |
| 5,469,553 | 11/1995 | Patrick . |
| 5,481,683 | 1/1996 | Karim . |
| 5,497,317 | 3/1996 | Hawkins et al. . |
| 5,509,130 | 4/1996 | Trauben et al. . |
| 5,535,346 | 7/1996 | Thomas, Jr. ............................. 395/393 |
| 5,542,058 | 7/1996 | Brown, III et al. ..................... 395/557 |
| 5,546,599 | 8/1996 | Song . |
| 5,548,738 | 8/1996 | Song . |
| 5,559,976 | 9/1996 | Song . |
| 5,751,985 | 5/1998 | Shen et al. ............................... 395/394 |
| 5,805,849 | 9/1998 | Jordan et al. ........................... 712/214 |
| 5,870,582 | 2/1999 | Cheong et al. .......................... 712/218 |
| 5,870,612 | 2/1999 | Cheong et al. .......................... 712/260 |

OTHER PUBLICATIONS

Weiss, et al., "Instruction Issue Logic in Pipelined Supercomputers", IEEE Transactions on Computers, vol. C–33, No. 11, Nov. 1984 pp. 1013–1022.

"Register Dataflow", Superscalar Microprocessor Design, Chapter 6, 103–126.

Logically Deleted Parts, "IBM Technical Disclosure Bulletin", vol. 32, No. 3B, Aug. 1989, pp. 280–287.

"Trace–Directed Program Restructuring for Both Pinned and Pageable Instructions", IBM Technical Disclosure Bulletin, vol. 37, No. 02B, Feb. 1994, pp. 667–668.

"Grouping of Instructions", IBM Technical Disclosure Bulletin, vol. 38, No. 08, Aug. 1995, pp. 531–533.

Primary Examiner—Eric Coleman
Assistant Examiner—Gautam R. Patel
Attorney, Agent, or Firm—Anthony V.S. England

[57] ABSTRACT

In maintaining the state of a processor, a dispatched instruction is given an identification tag and an associated entry in an architectural register table. The identification tag of the dispatched instruction is written to the entry in the architectural register table, if the identification tag of the dispatched instruction is more recent than a prior instruction identification tag stored in the entry.

16 Claims, 55 Drawing Sheets

|  | Valid/Tagged 100 | Value 102 | TID 104 | Written since last interupt stack entry 106 |
|---|---|---|---|---|
| Register 0 | | | | |
| Register 1 | | | | |
| Register 2 | | | | |
| Register 3 | | | | |
| Register 4 | | | | |
| Register 5 | | | | |
| . | | | | |
| . | | | | |
| Register 30 | | | | |
| Register 31 | | | | |

FIGURE 1

| | Instruction TID | Architected Register | Valid/ Tagged | Value | TID |
|---|---|---|---|---|---|
| Oldest→ | | | | | |
| | | | | | |
| | | | | | |
| | | | | | |
| | | | | | |
| | | | | | |
| Newest→ | | | | | |
| | | | | | |
| | | | | | |

FIGURE 2

| TID 118 | Opcode 120 | Destin. 122 | Valid/ Tagged 124a | Value 126a | TID 128a | Valid/ Tagged 124b | Value 126b | TID 128b |
|---|---|---|---|---|---|---|---|---|
| | | | | | | | | |
| | | | | | | | | |
| | | | | | | | | |
| | | | | | | | | |
| | | | | | | | | |
| | | | | | | | | |
| | | | | | | | | |

FIGURE 3

| TID 129 | Address 130 | Done 132 | |
|---|---|---|---|
| | | | oldest |
| | | | |
| | | | |
| | | | |
| | | | |
| | | | |
| | | | |
| | | | newest |

FIGURE 4

TID

| | 1 | ai | r4 ← r4 + 1 |
|---|---|---|---|
| Dispatch Point → | | | |
| | 2 | bc | cr0, label 1 |
| | 3 | st | r3, 0(r2) |
| | 4 | L | r4 ← 8(r4) |
| | 5 | A | r2 ← r2 + r1 |
| | 6 | Add e0 | r3 ← r4 + r4 |

Figure 5A

| Instruction TID | Architected Register | Valid/ Tagged | Value | TID | |
|---|---|---|---|---|---|
| 1 | 4 | V | Old Value | - | 600 |
| | | | | | 602 |
| | | | | | 604 |
| | | | | | 606 |
| | | | | | 608 |
| | | | | | 610 |
| | | | | | 612 |
| | | | | | 614 |
| | | | | | 616 |

FIGURE 6A

| TID | Address | Done | |
|---|---|---|---|
| | | | 900 |
| | | | 902 |
| | | | 904 |
| | | | 906 |
| | | | 908 |
| | | | 910 |
| | | | 912 |

FIGURE 9A

| TID | | | |
|---|---|---|---|
| | 1 | ai | r4 ← r4 + 1 |
| | 2 | bc | cr0, label 1 |
| Dispatch Point → | | | |
| | 3 | st | r3, 0(r2) |
| | 4 | L | r4 ← 8(r4) |
| | 5 | A | r2 ← r2 + r1 |
| | 6 | Add e0 | r3 ← r4 + r4 |

Figure 5B

| | TID | | |
|---|---|---|---|
| | 1 | ai | r4 ← r4 + 1 |
| | 2 | bc | cr0, label 1 |
| | 3 | st | r3, 0(r2) |
| Dispatch Point → | | | |
| | 4 | L | r4 ← 8(r4) |
| | 5 | A | r2 ← r2 + r1 |
| | 6 | Add e0 | r3 ← r4 + r4 |

Figure 5C

| Instruction TID | Architected Register | Valid/ Tagged | Value | TID | |
|---|---|---|---|---|---|
| 1 | 4 | V | Old Value | - | 600 |
| | | | | | |
| | | | | | |
| | | | | | |
| | | | | | |
| | | | | | |
| | | | | | |
| | | | | | |

FIGURE 6C

| TID | Address | Done | |
|---|---|---|---|
| 2 | addr (bc) | | 900 |
| 3 | addr (st) | | 902 |
| | | | |
| | | | |
| | | | |
| | | | |
| | | | |

FIGURE 9C

| | TID | | |
|---|---|---|---|
| | 1 | ai | r4 ← r4 + 1 |
| | 2 | bc | cr0, label 1 |
| | 3 | st | r3, 0(r2) |
| | 4 | L | r4 ← 8(r4) |
| Dispatch Point → | | | |
| | 5 | A | r2 ← r2 + r1 |
| | 6 | Add e0 | r3 ← r4 + r4 |

Figure 5D

| | TID | | |
|---|---|---|---|
| | 1 | ai | r4 ← r4 + 1 |
| | 2 | bc | cr0, label 1 |
| | 3 | st | r3, 0(r2) |
| | 4 | L | r4 ← 8(r4) |
| | 5 | A | r2 ← r2 + r1 |
| Dispatch Point → | | | |
| | 6 | Add e0 | r3 ← r4 + r4 |

Figure 5E

| Instruction TID | Architected Register | Valid/ Tagged | Value | TID | |
|---|---|---|---|---|---|
| 1 | 4 | V | Old Value | - | 600 |
| 4 | 4 | T | - | 1 | 602 |
| 5 | 2 | V | Old Value | - | 604 |
| | | | | | |
| | | | | | |
| | | | | | |
| | | | | | |
| | | | | | |
| | | | | | |

FIGURE 6E

| TID | Address | Done | |
|---|---|---|---|
| 2 | addr (bc) | | 900 |
| 3 | addr (st) | | 902 |
| 4 | addr (L) | | 904 |
| | | | |
| | | | |
| | | | |
| | | | |

FIGURE 9E

| | TID | | |
|---|---|---|---|
| | 1 | ai | r4 ← r4 + 1 |
| | 2 | bc | cr0, label 1 |
| | 3 | st | r3, 0(r2) |
| | 4 | L | r4 ← 8(r4) |
| | 5 | A | r2 ← r2 + r1 |
| | 6 | Add e0 | r3 ← r4 + r4 |
| Dispatch Point → | | | |

Figure 5F

| TID | | |
|---|---|---|
| 1 | ai | r4 ← r4 + 1 |
| 2 | bc | cr0, label 1 |
| 3 | st | r3, 0(r2) |
| 4 | L | r4 ← 8(r4) |
| 5 | A | r2 ← r2 + r1 |
| 6 | Add e0 | r3 ← r4 + r4 |

Figure 5G

| Instruction TID | Architected Register | Valid/ Tagged | Value | TID | |
|---|---|---|---|---|---|
| | | | | | 600 |
| 4 | 4 | V | result from instruction 1 | | 602 |
| 5 | 2 | V | Old Value | | 604 |
| 6 | 3 | V | Old Value | | 606 |
| | | | | | |
| | | | | | |
| | | | | | |
| | | | | | |

FIGURE 6G

| TID | Address | Done | |
|---|---|---|---|
| 2 | addr (bc) | | 900 |
| 3 | addr (st) | Done | 902 |
| 4 | addr (L) | | 904 |
| 6 | addr (add eo) | | 906 |
| | | | |
| | | | |
| | | | |

FIGURE 9G

| TID | | |
|---|---|---|
| 1 | ai | r4 ← r4 + 1 |
| 2 | bc | cr0, label 1 |
| 3 | st | r3, 0(r2) |
| 4 | L | r4 ← 8(r4) |
| 5 | A | r2 ← r2 + r1 |
| 6 | Add e0 | r3 ← r4 + r4 |

Figure 5H

| TID | | |
|---|---|---|
| 1 | ai | r4 ← r4 + 1 |
| 2 | bc | cr0, label 1 |
| 3 | st | r3, 0(r2) |
| 4 | L | r4 ← 8(r4) |
| 5 | A | r2 ← r2 + r1 |
| 6 | Add e0 | r3 ← r4 + r4 |

Figure 5I

| Instruction TID | Architected Register | Valid/ Tagged | Value | TID | |
|---|---|---|---|---|---|
| | | | | | 600 |
| | | | | | 602 |
| | | | | | 604 |
| | | | | | 606 |
| | | | | | |
| | | | | | |
| | | | | | |
| | | | | | |
| | | | | | |

FIGURE 6I

| TID | Address | Done |
|---|---|---|
|  |  |  |
|  |  |  |
|  |  |  |
|  |  |  |
|  |  |  |
|  |  |  |
|  |  |  |
|  |  |  |

| TID |  |  |
|---|---|---|
| 1 | ai | r4 ← r4 + 1 |
| 2 | bc | cr0, label 1 |
| 3 | st | r3, 0(r2) |
| 4 | L | r4 ← 8(r4) |
| 5 | A | r2 ← r2 + r1 |
| 6 | Add e0 | r3 ← r4 + r4 |

Figure 5J

| TID | | |
|---|---|---|
| 1 | ai | r4 ← r4 + 1 |
| 2 | bc | cr0, label 1 |
| 3 | st | r3, 0(r2) |
| 4 | L | r4 ← 8(r4) |
| 5 | A | r2 ← r2 + r1 |
| 6 | Add e0 | r3 ← r4 + r4 |

Figure 5K

| Instruction TID | Architected Register | Valid/ Tagged | Value | TID | |
|---|---|---|---|---|---|
|  |  |  |  |  | 600 |
| 4 | 4 | V | Instruction 1 result |  | 602 |
| 5 | 2 | V |  |  | 604 |
| 6 | 3 | V |  |  | 606 |
|  |  |  |  |  |  |
|  |  |  |  |  |  |
|  |  |  |  |  |  |
|  |  |  |  |  |  |
|  |  |  |  |  |  |

FIGURE 6K

| TID | Address | Done | |
|---|---|---|---|
| 2 | addr (bc) | | 900 |
| 3 | addr (st) | | 902 |
| 4 | addr (L) | | 904 |
| 6 | addr (add eo) | | 906 |
| | | | |
| | | | |
| | | | |

FIGURE 9K

| TID | | |
|---|---|---|
| 1 | ai | r4 ← r4 + 1 |
| 2 | bc | cr0, label 1 |
| 3 | st | r3, 0(r2) |
| 4 | L | r4 ← 8(r4) |
| 5 | A | r2 ← r2 + r1 |
| 6 | Add e0 | r3 ← r4 + r4 |

Figure 5L

| TID | | |
|---|---|---|
| 1 | ai | r4 ← r4 + 1 |
| 2 | bc | cr0, label 1 |
| 3 | st | r3, 0(r2) |
| 4 | L | r4 ← 8(r4) |
| 5 | A | r2 ← r2 + r1 |
| 6 | Add e0 | r3 ← r4 + r4 |

Figure 5M

| Instruction TID | Architected Register | Valid/ Tagged | Value | TID | |
|---|---|---|---|---|---|
| | | | | | 600 |
| 4 | 4 | V | | | 602 |
| 5 | 2 | V | | | 604 |
| 6 | 3 | V | | | 606 |
| | | | | | |
| | | | | | |
| | | | | | |
| | | | | | |
| | | | | | |

FIGURE 6M

| TID | Address | Done |     |
|---|---|---|---|
| 2 | addr (bc) |  | 900 |
| 3 | addr (st) | Done | 902 |
| 4 | addr (L) | Done | 904 |
| 6 | addr (add eo) | Done | 906 |
|  |  |  |  |
|  |  |  |  |
|  |  |  |  |

FIGURE 9M

| TID |  |  |
|---|---|---|
| 1 | ai | r4 ← r4 + 1 |
| 2 | bc | cr0, label 1 |
| 3 | st | r3, 0(r2) |
| 4 | L | r4 ← 8(r4) |
| 5 | A | r2 ← r2 + r1 |
| 6 | Add e0 | r3 ← r4 + r4 |

Figure 5N

| TID | | |
|---|---|---|
| 1 | ai | r4 ← r4 + 1 |
| 2 | bc | cr0, label 1 |
| 3 | st | r3, 0(r2) |
| 4 | L | r4 ← 8(r4) |
| 5 | A | r2 ← r2 + r1 |
| 6 | Add e0 | r3 ← r4 + r4 |

Figure 5O

| Instruction TID | Architected Register | Valid/ Tagged | Value | TID | |
|---|---|---|---|---|---|
|  |  |  |  |  | 600 |
| 4 | 4 | V |  |  | 602 |
| 5 | 2 | V |  |  | 604 |
| 6 | 3 | V |  |  | 606 |
|  |  |  |  |  |  |
|  |  |  |  |  |  |
|  |  |  |  |  |  |
|  |  |  |  |  |  |
|  |  |  |  |  |  |

FIGURE 6O

| TID | Address | Done | |
|---|---|---|---|
| 2 | addr (bc) | | 900 |
| 3 | addr (st) | Done | 902 |
| 4 | addr (L) | Done | 904 |
| | | | |
| | | | |
| | | | |
| | | | |

FIGURE 9O

| TID | | |
|---|---|---|
| 1 | ai | r4 ← r4 + 1 |
| 2 | bc | cr0, label 1 |
| 3 | st | r3, 0(r2) |
| 4 | L | r4 ← 8(r4) |
| 5 | A | r2 ← r2 + r1 |
| 6 | Add e0 | r3 ← r4 + r4 |

Figure 5P

| TID | | |
|---|---|---|
| 1 | ai | r4 ← r4 + 1 |
| 2 | bc | cr0, label 1 |
| 3 | st | r3, 0(r2) |
| 4 | L | r4 ← 8(r4) |
| 5 | A | r2 ← r2 + r1 |
| 6 | Add e0 | r3 ← r4 + r4 |

Figure 5Q

| Instruction TID | Architected Register | Valid/ Tagged | Value | TID |
|---|---|---|---|---|
|  |  |  |  |  |
|  |  |  |  |  |
| 6 | 3 | V |  |  |
|  |  |  |  |  |
|  |  |  |  |  |
|  |  |  |  |  |
|  |  |  |  |  |
|  |  |  |  |  |
|  |  |  |  |  |

| TID | Address | Done | |
|---|---|---|---|
|  |  |  | 900 |
| 3 | addr (st) | Done | 902 |
| 4 | addr (L) | Done | 904 |
| 6 | addr (add e0) |  | 906 |
|  |  |  |  |
|  |  |  |  |
|  |  |  |  |

FIGURE 9Q

| TID | | |
|---|---|---|
| 1 | ai | r4 ← r4 + 1 |
| 2 | bc | cr0, label 1 |
| 3 | st | r3, 0(r2) |
| 4 | L | r4 ← 8(r4) |
| 5 | A | r2 ← r2 + r1 |
| 6 | Add e0 | r3 ← r4 + r4 |

Figure 5R

| Instruction TID | Architected Register | Valid/Tagged | Value | TID | |
|---|---|---|---|---|---|
| 1 | 4 | V | Old Value | - | 600 |
| | | | | | |
| | | | | | |
| | | | | | |
| | | | | | |
| | | | | | |
| | | | | | |
| | | | | | |
| | | | | | |

FIGURE 6B

| | Valid/Tagged | Value | TID | Written since last interupt stack entry | |
|---|---|---|---|---|---|
| Register 0 | | | | | |
| Register 1 | | | | | |
| Register 2 | | | | | |
| Register 3 | | | | | |
| Register 4 | T | - | 1 | - | 708 |
| Register 5 | | | | | |
| ... | | | | | |
| Register 31 | | | | | |

FIGURE 7B

| Instruction TID | Architected Register | Valid/ Tagged | Value | TID | |
|---|---|---|---|---|---|
| 1 | 4 | V | Old Value | - | 600 |
| 4 | 4 | T | - | 1 | 602 |
| | | | | | |
| | | | | | |
| | | | | | |
| | | | | | |
| | | | | | |
| | | | | | |
| | | | | | |

FIGURE 6D

| | Valid/Tagged | Value | TID | Written since last interrupt stack entry | |
|---|---|---|---|---|---|
| Register 0 | | | | | |
| Register 1 | | | | | |
| Register 2 | | | | | |
| Register 3 | | | | | |
| Register 4 | T | - | 4 | - | 708 |
| Register 5 | | | | | |
| ⋮ | | | | | |
| Register 31 | | | | | |

FIGURE 7D

| Instruction TID | Architected Register | Valid/ Tagged | Value | TID | |
|---|---|---|---|---|---|
| 1 | 4 | V | Old Value | - | 600 |
| 4 | 4 | T | - | 1 | 602 |
| 5 | 2 | V | Old Value | - | 604 |
| 6 | 3 | V | Old Value | - | 606 |
|   |   |   |   |   | |
|   |   |   |   |   | |
|   |   |   |   |   | |
|   |   |   |   |   | |
|   |   |   |   |   | |

FIGURE 6F

|  | Valid/Tagged | Value | TID | Written since last interrupt stack entry | |
|---|---|---|---|---|---|
| Register 0 |   |   |   |   | |
| Register 1 |   |   |   |   | |
| Register 2 | T | - | 5 | - | 704 |
| Register 3 | T | - | 6 | - | 706 |
| Register 4 | T | - | 4 | - | 708 |
| Register 5 |   |   |   |   | |
| . |   |   |   |   | |
| . |   |   |   |   | |
| Register 31 |   |   |   |   | |

FIGURE 7F

| Instruction TID | Architected Register | Valid/Tagged | Value | TID | |
|---|---|---|---|---|---|
| | | | | | 600 |
| 4 | 4 | V | instruction 1 result | | 602 |
| 5 | 2 | V | Old Value | | 604 |
| 6 | 3 | V | Old Value | | 606 |
| | | | | | |
| | | | | | |
| | | | | | |
| | | | | | |
| | | | | | |

FIGURE 6II

| | Valid/Tagged | Value | TID | Written since last interupt stack entry | |
|---|---|---|---|---|---|
| Register 0 | | | | | |
| Register 1 | | | | | 702 |
| Register 2 | V | instruction 5 result | | - | 704 |
| Register 3 | T | - | 6 | - | 706 |
| Register 4 | V | instruction 4 result | | - | 708 |
| Register 5 | | | | | |
| . | | | | | |
| . | | | | | |
| Register 31 | | | | | |

FIGURE 7II

| Instruction TID | Architected Register | Valid/ Tagged | Value | TID | |
|---|---|---|---|---|---|
| | | | | | oldest |
| | | | | | |
| | | | | | |
| | | | | | |
| | | | | | |
| | | | | | |
| | | | | | |
| | | | | | |
| | | | | | |

FIGURE 6J

| | Valid/Tagged | Value | TID | Written since last interupt stack entry |
|---|---|---|---|---|
| Register 0 | | | | |
| Register 1 | | | | |
| Register 2 | | | | |
| Register 3 | | | | |
| Register 4 | | | | |
| Register 5 | | | | |
| . | | | | |
| . | | | | |
| Register 31 | | | | |

FIGURE 7J

| Instruction TID | Architected Register | Valid/ Tagged | Value | TID | |
|---|---|---|---|---|---|
|  |  |  |  |  | 600 |
| 4 | 4 | V |  |  | 602 |
| 5 | 2 | V |  |  | 604 |
| 6 | 3 | V |  |  | 606 |
|  |  |  |  |  |  |
|  |  |  |  |  |  |
|  |  |  |  |  |  |
|  |  |  |  |  |  |
|  |  |  |  |  |  |

FIGURE 6L

|  | Valid/Tagged | Value | TID | Written since last interupt stack entry | |
|---|---|---|---|---|---|
| Register 0 |  |  |  |  | 700 |
| Register 1 |  |  |  |  | 702 |
| Register 2 | V |  |  | - | 704 |
| Register 3 | T | - | 6 | - | 706 |
| Register 4 | V | instruction 4 result |  | - | 708 |
| Register 5 |  |  |  |  |  |
| . |  |  |  |  |  |
| . |  |  |  |  |  |
| Register 31 |  |  |  |  |  |

FIGURE 7L

| Instruction TID | Architected Register | Valid/ Tagged | Value | TID | |
|---|---|---|---|---|---|
| | | | | | oldest |
| | | | | | |
| | | | | | |
| | | | | | |
| | | | | | |
| | | | | | |
| | | | | | |
| | | | | | |
| | | | | | |

FIGURE 6N

| | Valid/Tagged | Value | TID | Written since last interupt stack entry |
|---|---|---|---|---|
| Register 0 | | | | |
| Register 1 | | | | |
| Register 2 | | | | |
| Register 3 | | | | |
| Register 4 | | | | |
| Register 5 | | | | |
| . | | | | |
| . | | | | |
| Register 31 | | | | |

FIGURE 7N

| Instruction TID | Architected Register | Valid/ Tagged | Value | TID | |
|---|---|---|---|---|---|
| | | | | | 600 |
| 4 | 4 | V | Instruction 2 result | | 602 |
| 5 | 2 | V | | | 604 |
| 6 | 3 | V | | | 606 |
| | | | | | |
| | | | | | |
| | | | | | |
| | | | | | |
| | | | | | |

FIGURE 6P

| | Valid/Tagged | Value | TID | Written since last interupt stack entry | |
|---|---|---|---|---|---|
| Register 0 | | | | | 700 |
| Register 1 | | | | | 702 |
| Register 2 | T | - | 5 | | 704 |
| Register 3 | T | - | 6 | | 706 |
| Register 4 | T | - | 4 | | 708 |
| Register 5 | | | | | |
| . | | | | | |
| . | | | | | |
| Register 31 | | | | | |

FIGURE 7P

| Instruction TID | Architected Register | Valid/Tagged | Value | TID | |
|---|---|---|---|---|---|
| | | | | | oldest |
| | | | | | |
| | | | | | |
| | | | | | |
| | | | | | |
| | | | | | |
| | | | | | |
| | | | | | |
| | | | | | |

FIGURE 6R

| | Valid/Tagged | Value | TID | Written since last interupt stack entry | |
|---|---|---|---|---|---|
| Register 0 | | | | | |
| Register 1 | | | | | |
| Register 2 | V | | | | 704 |
| Register 3 | V | instruction 6 result | | | 706 |
| Register 4 | V | | | | 708 |
| Register 5 | | | | | |
| . | | | | | |
| . | | | | | |
| Register 31 | | | | | |

FIGURE 7R

|  | Valid/Tagged 100 | Value 102 | TID 104 | Written since last interupt stack entry 106 | |
|---|---|---|---|---|---|
| Register 0 |  |  |  |  | 700 |
| Register 1 |  |  |  |  | 702 |
| Register 2 |  |  |  |  | 704 |
| Register 3 |  |  |  |  | 706 |
| Register 4 | T | - | 1 | - | 708 |
| Register 5 |  |  |  |  |  |
| . |  |  |  |  |  |
| . |  |  |  |  |  |
| Register 30 |  |  |  |  |  |
| Register 31 |  |  |  |  |  |

FIGURE 7A

| TID | Opcode | Destin. | Valid/Tagged | Value | TID | Valid/Tagged | Value | TID |  |
|---|---|---|---|---|---|---|---|---|---|
|  |  |  |  |  |  |  |  |  | 812 |
|  |  |  |  |  |  |  |  |  | 810 |
|  |  |  |  |  |  |  |  |  | 808 |
|  |  |  |  |  |  |  |  |  | 806 |
|  |  |  |  |  |  |  |  |  | 804 |
|  |  |  |  |  |  |  |  |  | 802 |
| 1 | Ai | 4 | V | Value |  | V | Value |  | 800 oldest |

FIGURE 8A

| | Valid/Tagged | Value | TID | Written since last interupt stack entry | |
|---|---|---|---|---|---|
| Register 0 | | | | | |
| Register 1 | | | | | |
| Register 2 | | | | | |
| Register 3 | | | | | |
| Register 4 | T | - | 1 | - | 708 |
| Register 5 | | | | | |
| . | | | | | |
| . | | | | | |
| Register 31 | | | | | |

FIGURE 7C

| TID | Opcode | Destin. | Valid/Tagged | Value | TID | Valid/Tagged | Value | TID | |
|---|---|---|---|---|---|---|---|---|---|
| | | | | | | | | | |
| | | | | | | | | | |
| | | | | | | | | | |
| | | | | | | | | | |
| | | | | | | | | | |
| 3 | St | - | V | Value | | V | Value | | 802 |
| 1 | Ai | 4 | V | Value | | V | Value | | 800 |

FIGURE 8C

|  | Valid/Tagged | Value | TID | Written since last interupt stack entry | |
|---|---|---|---|---|---|
| Register 0 | | | | | |
| Register 1 | | | | | |
| Register 2 | T | - | 5 | - | 704 |
| Register 3 | | | | | |
| Register 4 | T | - | 4 | - | 708 |
| Register 5 | | | | | |
| . | | | | | |
| . | | | | | |
| Register 31 | | | | | |

FIGURE 7E

| TID | Opcode | Destin. | Valid/Tagged | Value | TID | Valid/Tagged | Value | TID | |
|---|---|---|---|---|---|---|---|---|---|
| | | | | | | | | | |
| | | | | | | | | | |
| | | | | | | | | | |
| 5 | A | 2 | V | Value | | V | Value | | 806 |
| 4 | L | 4 | T | | 1 | V | Value | | 804 |
| 3 | St | - | V | Value | | V | Value | | 802 |
| 1 | Ai | 4 | V | Value | | V | Value | | 800 |

FIGURE 8E

|  | Valid/Tagged | Value | TID | Written since last interupt stack entry |
|---|---|---|---|---|
| Register 0 |  |  |  |  |
| Register 1 |  |  |  |  |
| Register 2 | T | - | 5 | - |
| Register 3 | T | - | 6 | - |
| Register 4 | T | - | 4 | - |
| Register 5 |  |  |  |  |
| . |  |  |  |  |
| . |  |  |  |  |
| Register 31 |  |  |  |  |

| TID | Opcode | Destin. | Valid/Tagged | Value | TID | Valid/Tagged | Value | TID |
|---|---|---|---|---|---|---|---|---|
|  |  |  |  |  |  |  |  |  |
|  |  |  |  |  |  |  |  |  |
| 6 | add eo | 3 | T |  | 4 | T |  | 4 |
| 5 | A | 2 | V |  |  | V |  |  |
| 4 | L | 4 | T |  | 1 | V |  |  |
|  |  |  |  |  |  |  |  |  |
|  |  |  |  |  |  |  |  |  |

|  | Valid/Tagged | Value | TID | Written since last interupt stack entry | |
|---|---|---|---|---|---|
| Register 0 |  |  |  |  | 700 |
| Register 1 |  |  |  |  | 702 |
| Register 2 |  |  |  |  | 704 |
| Register 3 |  |  |  |  | 706 |
| Register 4 |  |  |  |  | 708 |
| Register 5 |  |  |  |  | |
| . |  |  |  |  | |
| . |  |  |  |  | |
| Register 31 |  |  |  |  | |

FIGURE 7I

| TID | Opcode | Destin. | Valid/Tagged | Value | TID | Valid/Tagged | Value | TID | |
|---|---|---|---|---|---|---|---|---|---|
|  |  |  |  |  |  |  |  |  | |
|  |  |  |  |  |  |  |  |  | |
|  |  |  |  |  |  |  |  |  | 808 |
|  |  |  |  |  |  |  |  |  | 806 |
|  |  |  |  |  |  |  |  |  | 804 |
|  |  |  |  |  |  |  |  |  | 802 |
|  |  |  |  |  |  |  |  |  | 800 |

FIGURE 8I

|  | Valid/Tagged | Value | TID | Written since last interupt stack entry | |
|---|---|---|---|---|---|
| Register 0 | | | | | 700 |
| Register 1 | | | | | 702 |
| Register 2 | V | instruction 5 result | | | 704 |
| Register 3 | T | - | 6 | | 706 |
| Register 4 | T | - | 4 | | 708 |
| Register 5 | | | | | |
| . | | | | | |
| . | | | | | |
| Register 31 | | | | | |

FIGURE 7K

| TID | Opcode | Destin. | Valid/Tagged | Value | TID | Valid/Tagged | Value | TID | |
|---|---|---|---|---|---|---|---|---|---|
| | | | | | | | | | |
| | | | | | | | | | |
| 6 | add eo | 3 | T | | 4 | T | | 4 | 808 |
| | | | | | | | | | 806 |
| 4 | L | 4 | result from 1 | | | V | | | 804 |
| 3 | St | - | V | | | V | | | 802 |
| | | | | | | | | | 800 |

FIGURE 8K

|  | Valid/Tagged | Value | TID | Written since last interupt stack entry | |
|---|---|---|---|---|---|
| Register 0 | | | | | 700 |
| Register 1 | | | | | 702 |
| Register 2 | V | | | | 704 |
| Register 3 | V | instruction 6 result | | | 706 |
| Register 4 | V | | | | 708 |
| Register 5 | | | | | |
| . | | | | | |
| . | | | | | |
| Register 31 | | | | | |

FIGURE 7M

| TID | Opcode | Destin. | Valid/Tagged | Value | TID | Valid/Tagged | Value | TID | |
|---|---|---|---|---|---|---|---|---|---|
| | | | | | | | | | |
| | | | | | | | | | |
| | | | | | | | | | 808 |
| | | | | | | | | | 806 |
| | | | | | | | | | 804 |
| | | | | | | | | | 802 |
| | | | | | | | | | oldest 800 |

FIGURE 8M

|  | Valid/Tagged | Value | TID | Written since last interupt stack entry |
|---|---|---|---|---|
| Register 0 | | | | |
| Register 1 | | | | |
| Register 2 | | | | |
| Register 3 | | | | |
| Register 4 | | | | |
| Register 5 | | | | |
| . | | | | |
| . | | | | |
| Register 31 | | | | |

FIGURE 7O

| TID | Opcode | Destin. | Valid/Tagged | Value | TID | Valid/Tagged | Value | TID |
|---|---|---|---|---|---|---|---|---|
| | | | | | | | | |
| | | | | | | | | |
| | | | | | | | | |
| | | | | | | | | |
| | | | | | | | | |
| | | | | | | | | |
| | | | | | | | | oldest |

FIGURE 8O

| | Valid/Tagged | Value | TID | Written since last interupt stack entry | |
|---|---|---|---|---|---|
| Register 0 | | | | | |
| Register 1 | | | | | |
| Register 2 | V | instruction 5 result | | | 704 |
| Register 3 | T | 6 | | | 706 |
| Register 4 | V | instruction 4 result | | | 708 |
| Register 5 | | | | | |
| . | | | | | |
| . | | | | | |
| Register 31 | | | | | |

FIGURE 7Q

| TID | Opcode | Destin. | Valid/Tagged | Value | TID | Valid/Tagged | Value | TID | |
|---|---|---|---|---|---|---|---|---|---|
| | | | | | | | | | |
| | | | | | | | | | |
| 6 | add eo | 3 | V | | | V | | | 808 |
| | | | | | | | | | |
| | | | | | | | | | |
| | | | | | | | | | |
| | | | | | | | | | oldest |

FIGURE 8Q

| TID | Opcode | Destin. | Valid/Tagged | Value | TID | Valid/Tagged | Value | TID |
|---|---|---|---|---|---|---|---|---|
| | | | | | | | | |
| | | | | | | | | |
| | | | | | | | | |
| | | | | | | | | |
| | | | | | | | | |
| | | | | | | | | |
| 1 | Ai | 4 | V | Value | | V | Value | |

| TID | Address | Done |
|---|---|---|
| 2 | addr (bc) | |
| | | |
| | | |
| | | |
| | | |
| | | |

| TID | Opcode | Destin. | Valid/Tagged | Value | TID | Valid/Tagged | Value | TID | |
|---|---|---|---|---|---|---|---|---|---|
| | | | | | | | | | |
| | | | | | | | | | |
| | | | | | | | | | |
| | | | | | | | | | |
| 4 | L | 4 | T | | 1 | V | Value | | 804 |
| 3 | St | - | V | Value | | V | Value | | 802 |
| 1 | Ai | 4 | V | Value | | V | Value | | 800 |

FIGURE 8D

| TID | Address | Done | |
|---|---|---|---|
| 2 | addr (bc) | | 900 |
| 3 | addr (st) | | 902 |
| 4 | addr (L) | | 904 |
| | | | |
| | | | |
| | | | |
| | | | |

FIGURE 9D

| TID | Opcode | Destin. | Valid/Tagged | Value | TID | Valid/Tagged | Value | TID | |
|---|---|---|---|---|---|---|---|---|---|
|  |  |  |  |  |  |  |  |  |  |
|  |  |  |  |  |  |  |  |  |  |
| 6 | add eo | 3 | T |  | 4 | T |  | 4 | 808 |
| 5 | A | 2 | V | Value |  | V | Value |  | 806 |
| 4 | L | 4 | T |  | 1 | V | Value |  | 804 |
| 3 | St | - | V | Value |  | V | Value |  | 802 |
| 1 | Ai | 4 | V | Value |  | V | Value |  | 800 |

FIGURE 8F

| TID | Address | Done | |
|---|---|---|---|
| 2 | addr (bc) |  | 900 |
| 3 | addr (st) |  | 902 |
| 4 | addr (L) |  | 904 |
| 6 | addr (add eo) |  | 906 |
|  |  |  |  |
|  |  |  |  |
|  |  |  |  |

FIGURE 9F

| TID | Opcode | Destin. | Valid/<br>Tagged | Value | TID | Valid/<br>Tagged | Value | TID | |
|---|---|---|---|---|---|---|---|---|---|
|  |  |  |  |  |  |  |  |  |  |
|  |  |  |  |  |  |  |  |  |  |
| 6 | add eo | 3 | V |  |  | V |  |  | 808 |
|  |  |  |  |  |  |  |  |  | 806 |
|  |  |  |  |  |  |  |  |  | 804 |
|  |  |  |  |  |  |  |  |  | 802 |
|  |  |  |  |  |  |  |  |  | 800 |

FIGURE 8H

| TID | Address | Done | |
|---|---|---|---|
| 2 | addr (bc) |  | 900 |
| 3 | addr (st) | Done | 902 |
| 4 | addr (L) | Done | 904 |
| 6 | addr (add eo) |  | 906 |
|  |  |  |  |
|  |  |  |  |
|  |  |  |  |

FIGURE 9H

| TID | Opcode | Destin. | Valid/Tagged | Value | TID | Valid/Tagged | Value | TID |
|---|---|---|---|---|---|---|---|---|
| | | | | | | | | |
| | | | | | | | | |
| | | | | | | | | |
| | | | | | | | | |
| | | | | | | | | |
| | | | | | | | | |
| | | | | | | | | oldest |

FIGURE 8J

| TID | Address | Done | |
|---|---|---|---|
| 2 | addr (bc) | | 900 |
| 3 | addr (st) | Done | 902 |
| | | | |
| | | | |
| | | | |
| | | | |
| | | | |

FIGURE 9J

| TID | Opcode | Destin. | Valid/<br>Tagged | Value | TID | Valid/<br>Tagged | Value | TID | |
|---|---|---|---|---|---|---|---|---|---|
| | | | | | | | | | |
| | | | | | | | | | |
| 6 | add eo | 3 | V | | | V | | | 808 |
| | | | | | | | | | 806 |
| | | | | | | | | | 804 |
| 3 | St | - | V | | | V | | | 802 |
| | | | | | | | | | 800 |

FIGURE 8L

| TID | Address | Done | |
|---|---|---|---|
| 2 | addr (bc) | | 900 |
| 3 | addr (st) | Done | 902 |
| 4 | addr (L) | | 904 |
| 6 | addr (add eo) | | 906 |
| | | | |
| | | | |
| | | | |

FIGURE 9L

| TID | Opcode | Destin. | Valid/ Tagged | Value | TID | Valid/ Tagged | Value | TID |
|---|---|---|---|---|---|---|---|---|
|  |  |  |  |  |  |  |  |  |
|  |  |  |  |  |  |  |  |  |
|  |  |  |  |  |  |  |  |  |
|  |  |  |  |  |  |  |  |  |
|  |  |  |  |  |  |  |  |  |
|  |  |  |  |  |  |  |  |  |
|  |  |  |  |  |  |  |  |  |
|  |  |  |  |  |  |  |  |  | oldest

FIGURE 8N

| TID | Address | Done |  |
|---|---|---|---|
| 2 | addr (bc) |  | 900 |
| 3 | addr (st) | Done | 902 |
|  |  |  |  |
|  |  |  |  |
|  |  |  |  |
|  |  |  |  |
|  |  |  |  |

FIGURE 9N

| TID | Opcode | Destin. | Valid/Tagged | Value | TID | Valid/Tagged | Value | TID | |
|---|---|---|---|---|---|---|---|---|---|
|  |  |  |  |  |  |  |  |  |  |
|  |  |  |  |  |  |  |  |  |  |
| 6 | add eo | 3 | T |  | 4 | T |  | 4 | 808 |
| 5 | A | 2 | V |  |  | V |  |  | 806 |
| 4 | L | 4 | V |  |  | V |  |  | 804 |
| 3 | St | - | V |  |  | V |  |  | 802 |
|  |  |  |  |  |  |  |  |  | 800 |

FIGURE 8P

| TID | Address | Done | |
|---|---|---|---|
| 2 | addr (bc) | Done | 900 |
| 3 | addr (st) |  | 902 |
| 4 | addr (L) |  | 904 |
| 6 | addr (add eo) |  | 906 |
|  |  |  |  |
|  |  |  |  |
|  |  |  |  |

FIGURE 9P

| TID | Opcode | Destin. | Valid/Tagged | Value | TID | Valid/Tagged | Value | TID |
|-----|--------|---------|--------------|-------|-----|--------------|-------|-----|
|     |        |         |              |       |     |              |       |     |
|     |        |         |              |       |     |              |       |     |
|     |        |         |              |       |     |              |       |     |
|     |        |         |              |       |     |              |       |     |
|     |        |         |              |       |     |              |       |     |
|     |        |         |              |       |     |              |       |     |
|     |        |         |              |       |     |              |       |     | oldest

FIGURE 8R

| TID | Address | Done |
|-----|---------|------|
|     |         |      | oldest
|     |         |      |
|     |         |      |
| 6   | addr (add eo) | Done | 906
|     |         |      |
|     |         |      |
|     |         |      |

FIGURE 9R

| TID | OPcode | Source CR Field ||||| Source Link/Count Register Field |||||
| --- | --- | --- | --- | --- | --- | --- | --- | --- | --- | --- | --- |
| | | Used/ Not Used | Valid/ Tagged | CR Value | CR TID | Predicted CR Outcome | Used/ Not Used | Valid/ Tagged | Link/ Count Value | Link/ Count TID | Link/ Count Predicted |
| | | | | | | | | | | | |
| | | | | | | | | | | | |
| | | | | | | | | | | | |

FIG. 11

INSTRUCTION

1. LOAD   R2 ← 0 (R2)
2. LOAD   R4 ← 0 (R2)
3. ADDI   R3 ← R4, 1
4. SUB    R4 ← R1, R0
5. ADDI   R4 ← R4, 5
6. SHIFT  R4 ← R4, 2

*FIG. 13*

| | 100<br>Valid/<br>Tagged | 102<br>Value | 104<br>TID | 106<br>Written since<br>last interrupt<br>stack entry | |
|---|---|---|---|---|---|
| Register 0 | V | Value Before Seg. | | | —1400 |
| Register 1 | V | Value Before Seg. | | | —1402 |
| Register 2 | T | - | 1 | | —1404 |
| Register 3 | T | - | 3 | | —1406 |
| Register 4 | T | - | 6 | | —1408 |
| ⋮ | | | | | |
| Register 30 | | | | | |
| Register 31 | | | | | |

*FIG. 14 GPR Table*

| | 108<br>Instruction<br>TID | 110<br>Architect<br>Register | 112<br>Valid/<br>Tagged | 114<br>Value | 116<br>TID | |
|---|---|---|---|---|---|---|
| | 1 | r2 | V | (r2) | - | —1500 |
| | 2 | r4 | V | (r4) | - | —1502 |
| Oldest ----▶ | 3 | r3 | V | (r3) | - | —1504 |
| | | | | | | —1506 |
| | | | | | | —1508 |
| | | | | | | —1510 |
| Newest ----▶ | | | | | | |
| | | | | | | |
| | | | | | | |

*FIG. 15 History Buffer Table*

| 118 | 120 | 122 | 124a Valid/ | 126a | 128a | 124b Valid/ | 126b | 128b | |
|---|---|---|---|---|---|---|---|---|---|
| TID | Opcode | Destin. | Tagged | Value | TID | Tagged | Value | TID | |
| 1 | L | 2 | V | 0 | - | V | (r2) | - | —1600 |
| 2 | L | 4 | V | 0 | - | T | - | 1 | —1602 |
| 3 | Ai | 3 | T | - | 2 | V | 1 | - | —1604 |
| 4 | Sub | 4 | V | (r1) | - | V | (r0) | - | —1606 |
| 5 | Ai | 4 | T | - | 4 | V | 5 | - | —1608 |
| 6 | Shift | 4 | T | | 5 | V | 2 | - | —1610 |
| | | | | | | | | | |

←--- Source 1 ---→  ←--- Source 2 ---→

FIG. 16 PEQ Structure

| 129 | 130 | 132 | |
|---|---|---|---|
| TID | Address | Done | |
| 1 | addr (TID1) | | Oldest |
| 2 | addr (TID2) | | |
| | | | |
| | | | |
| | | | |
| | | | |
| | | | |
| | | | Newest |

FIG. 17 Interrupt Stack

|  | 100<br>Valid/<br>Tagged | 102<br>Value | 104<br>TID | 106<br>Written since<br>last interrupt<br>stack entry | |
|---|---|---|---|---|---|
| Register 0 | V | Value Before Seg. |  | No | —1400 |
| Register 1 | V | Value Before Seg. |  | No | —1402 |
| Register 2 | T | - | 1 | No | —1404 |
| Register 3 | T | - | 3 | Yes | —1406 |
| Register 4 | V | result from instruction 6 (shift) |  | Yes | —1408 |
| ⋮ |  |  |  |  |  |
| Register 30 |  |  |  |  |  |
| Register 31 |  |  |  |  |  |

*FIG. 18 GPR Table*

|  | 108<br>Instruction<br>TID | 110<br>Architect<br>Register | 112<br>Valid/<br>Tagged | 114<br>Value | 116<br>TID | |
|---|---|---|---|---|---|---|
|  | 1 | 2 | V | Value before Seq. |  | —1500 |
|  | 2 | 4 | V | Value before Seq. |  | —1502 |
| Oldest ---▶ | 3 | 3 | V | Value before Seq. |  | —1504 |
|  |  |  |  |  |  |  |
|  |  |  |  |  |  |  |
|  |  |  |  |  |  |  |
| Newest ---▶ |  |  |  |  |  |  |
|  |  |  |  |  |  |  |

*FIG. 19 History Buffer Table*

| 118 | 120 | 122 | 124a Valid/ Tagged | 126a Value | 128a TID | 124b Valid/ Tagged | 126b Value | 128b TID | |
|---|---|---|---|---|---|---|---|---|---|
| TID | Opcode | Destin. | | | | | | | |
| | | | | | | | | | |
| 2 | Load | R4 | V | 0 | - | T | - | 1 | — 1602 |
| 3 | Addi | R3 | T | - | 2 | V | 1 | - | — 1604 |
| | | | | | | | | | |
| | | | | | | | | | |
| | | | | | | | | | |
| | | | | | | | | | |

⟵--- Source 1 ---⟶ ⟵--- Source 2 ---⟶

FIG. 20 PEQ Structure

| 129 TID | 130 Address | 132 Done | |
|---|---|---|---|
| | | | Oldest |
| 2 | addr (load #2) | No | |
| | | | |
| | | | |
| | | | |
| | | | |
| | | | |
| | | | Newest |

FIG. 21 Interrupt Stack

APPARATUS AND METHOD FOR FAST UNIFIED INTERRUPT RECOVERY AND BRANCH RECOVERY IN PROCESSORS SUPPORTING OUT-OF-ORDER EXECUTION

TECHNICAL FIELD

The present invention relates generally to the field of processors which support out-of-order execution of instructions, and more particularly, to an apparatus and method for unified interrupt and branch recovery useful in processors supporting out-of-order execution.

CROSS-REFERENCE TO RELATED PATENT APPLICATIONS

This patent is related to the following earlier filed applications, which are assigned to the assignee of the present application and which are hereby incorporated herein by reference:

METHOD AND APPARATUS FOR IMPROVED RECOVERY OF PROCESSOR STATE USING HISTORY BUFFER, U.S. patent application Ser. No. 08/729,307, filed Oct. 15, 1996;

METHOD AND APPARATUS FOR WRITING INFORMATION TO REGISTERS IN A DATA PROCESSING SYSTEM USING A NUMBER OF REGISTERS FOR PROCESSING INSTRUCTIONS, U.S. patent application Ser. No. 08/729,308, filed Oct. 15, 1996; and METHOD AND APPARATUS FOR CONDENSED HISTORY BUFFER, U.S. patent application Ser. No. 08/729,309, filed Oct. 15, 1996.

This patent is related to the following applications filed on the same date herewith, which are assigned to the assignee of the present application and which are hereby incorporated herein by reference:

ISSUING INSTRUCTIONS IN A PROCESSOR SUPPORTING OUT-OF-ORDER EXECUTION, U.S. patent application Ser. No. 08/829,662 (Attorney Docket No. AA9-96-048);

DISPATCHING INSTRUCTIONS IN A PROCESSOR SUPPORTING OUT-OF-ORDER EXECUTION, U.S. patent application Ser. No. 08/829,663 (Attorney Docket No. AT9-97-001);

METHOD AND APPARATUS FOR IMPROVED INSTRUCTION COMPLETION, U.S. patent application Ser. No. 08/829,671, now U.S. Pat. No. 5,870,582; (Attorney Docket No. AA9-96-061).

DATA PROCESSING SYSTEM AND METHOD FOR DETERMINING AN INSTRUCTION ORDER USING AN INSTRUCTION IDENTIFIER, U.S. patent application Ser. No. 08/829,592, now U.S. Pat. No. 5,805,849. (Attorney Docket No. AT9-97-022).

BACKGROUND

High performance processors currently used in data processing systems today may be capable of "superscalar" operation and may have "pipelined" elements. A superscalar processor has multiple elements which operate in parallel to process multiple instructions in a single processing cycle. Pipelining involves processing instructions in stages, so that the pipelined stages may process a number of instructions concurrently.

In a typical first stage, referred to as an "instruction fetch" stage, an instruction is fetched from memory. Then, in a "decode" stage, the instruction is decoded into different control bits, which in general designate i) a type of functional unit for performing the operation specified by the instruction, ii) source operands for the operation and iii) destinations for results of operations. Next, in a "dispatch" stage, the decoded instruction is dispatched per the control bits to a unit having an "execution" stage. This stage processes the operation as specified by the instruction. Executing an operation specified by an instruction includes accepting one or more operands and producing one or more results.

A "completion" stage deals with program order issues that arise from concurrent execution, wherein multiple, concurrently executed instructions may deposit results in a single register. It also handles issues arising from instructions subsequent to an interrupted instruction depositing results in their destination registers. In the completion stage an instruction waits for the point at which there is no longer a possibility of an interrupt so that depositing its results will not violate the program order, at which point the instruction is considered "complete", as the term is used herein. Associated with a completion stage, there may be buffers to hold execution results before results are deposited into the destination register, and/or buffers to backup content of registers at specified checkpoints in case an interrupt needs to revert the register content to its pre-checkpoint value. Either or both types of buffers can be employed in a particular implementation. At completion, the results of execution in the holding buffer will be deposited into the destination register and the backup buffer will be released.

While instructions for the above described processor may originally be prepared for processing in some programmed, logical sequence, it should be understood that they may be processed, in some respects, in a different sequence. However, since instructions are not totally independent of one another, complications arise. That is, the processing of one instruction may depend on a result from another instruction. For example, the processing of an instruction which follows a branch instruction will depend on the branch path chosen by the branch instruction. In another example, the processing of an instruction which reads the contents of some memory element in the processing system may depend on the result of some preceding instruction which writes to that memory element.

As these examples suggest, if one instruction is dependent on a first instruction and the instructions are to be processed concurrently or the dependent instruction is to be processed before the first instruction, an assumption must be made regarding the result produced by the first instruction. The "state" of the processor, as defined at least in part by the content of registers the processor uses for execution of instructions, may change from cycle to cycle. If an assumption used for processing an instruction proves to be incorrect then, of course, the result produced by the processing of the instruction will almost certainly be incorrect, and the processor state must recover to a state with known correct results up to the instruction for which the assumption is made. (Herein, an instruction for which an assumption has been made is referred to as an "interruptible instruction", and the determination that an assumption is incorrect, triggering the need for the processor state to recover to a prior state, is referred to as an "interruption". The point in the instruction stream at which the interruptible instruction occurs is referred as the "interrupt point".) In addition to incorrect assumptions, there are other causes of such interruptions requiring recovery of the processor state. Such an interruption is generally caused by an unusual condition arising in connection with instruction execution, error, or signal external to the processor.

The use of a history buffer ("HB") is known for saving a processor state before an interruptible instruction, so that if an interrupt occurs, HB control logic may recover the processor state to the interrupt point by restoring the content of registers.

History buffer schemes suffer from perceived difficulties in providing efficient mechanisms to back out the speculative updates which are required for exception recovery. As a result, the dominant mechanisms employed in current processors involve various rename register schemes. However, register rename techniques also provide considerable challenges for high-end processor designers.

For example, with renaming, when an instruction is dispatched the processor must perform a lookup in the rename register table to determine which rename register holds the current version of the specified architectural register. This two level register access (one into the rename table and one into the physical register file using the rename index) often is a cycle time limiting path. Moreover, the number of instructions which may be issued out-of-order depends on the number of rename registers available. When no rename registers are available, dispatch must be halted until rename registers again become available through the completion of instructions currently in the pipe.

Furthermore, most existing rename register based schemes incorporate a completion table to allow in-order completion of instructions. Instruction completion includes updating the architect ed register set with the "future file" copy of the register maintained in the rename register. The size of the completion table often forms a hard limit on the number of instructions which can be live, (e.g. dispatched but not yet completed.) Furthermore, the lifetime of a rename register basically consists of the interval from dispatch to in-order completion. Therefore, the number of rename registers often forms another hard limit for the number of live instructions for a given block of code.

Additionally, while rename registers are useful for maintaining future state results for speculatively executed instructions, additional mechanisms are often required to allow detection of exceptions and recovery from exceptions. For example, to allow recovery of speculative instructions beyond a predicted conditional branch, one solution is to tag instructions with a 2-bit tag identifying the basic block which contains the given instruction. When a branch is found to be mispredicted, its tag is broadcast, and instructions with tags for subsequent blocks are purged from the machine.

Tagging basic blocks (blocks of code delineated by branches) with unique tags allows flushing and refetching the instruction stream only at these branch points. Page faults which occur for loads and stores are often considered to occur much less frequently, so "cheaper", less responsive solutions are often employed. One common solution in schemes which incorporate a completion table is to simply wait until the offending instruction is the next step to be the completed instruction, flush all instructions from the machine, and take the interrupt at the location of the faulting instruction.

In systems which restrict the degree of out-of-order execution, especially for loads and stores, other mechanisms are used to maintain storage consistency. For example, in many systems, loads and stores are executed strictly on an in-order basis. As a result, if a load requires data from a location which is stored into by a previous store, the store will have already executed and a simple tracking mechanism can indicate whether it is safe for the load to proceed or if it should be held in execute waiting for the store to write the data into the cache. This simple mechanism is not easily adapted to handle more aggressive designs which allow out-of-order execution of loads and stores.

Speculative execution can also take the form of executing instructions which read the summary overflow flag out of order with respect to overflow (and hence summary overflow) setting instructions. In most cases, instructions which are capable of setting the overflow flag rarely do set the overflow flag. As a result, designs, such as PowerPC 604, choose not to incorporate special checking hardware to handle the rare cases, and simply execute the instructions in a serial fashion. When an overflow setting (e.g., OE=1) instruction is encountered at dispatch, dispatch is halted until all previous instructions complete. This ensures that all prior instructions get the "old" overflow flag value, the value prior to any potential update. Then the overflow setting instruction executes to completion. Then subsequent instructions are allowed to dispatch. Holding dispatch until the overflow setting instruction completes guarantees the subsequent instructions get the "new" value of the overflow and summary overflow flags. This simple mechanism is often selected partially because the designers choose not to support register rename techniques for flags such as overflow. While this is a simple mechanism to handle overflow setting instructions, the serialization effects on performance are fairly severe in codes which have even a moderate amount of such instructions. Since the overflow rarely occurs, one might get a performance advantage from "guessing" that the outcome will be that the overflow will not be set and speculatively execute subsequent instructions.

In addition to the general purpose registers ("GPRs") and the rename registers, most rename register schemes require a mapping table to track which rename register holds the most "recent" copy of a GPR; the mapping table is used by dispatch to determine the source location for an instruction's source registers.

As shown above, rename techniques by themselves do not provide a global solution to providing recovery for each of the various forms of speculative execution; therefore, several different mechanisms are often incorporated to handle mispredicted branches, page fault exceptions, load-hit-store collisions, overflow conditions, etc.

Accordingly, it is an object of the present invention to provide an apparatus method for handling interrupt and branch recovery which is independent of the type of interrupt that has occurred. Further objects and advantages of the present invention will become apparent in view of the following disclosure.

SUMMARY OF THE INVENTION

One aspect of the invention relates to a method for maintaining the architectural state of a processor. In one embodiment, the method comprises dispatching an instruction having an identification tag and an associated entry in an architectural register table; and writing the identification tag of the dispatched instruction to the entry in the architectural register table, if the identification tag of the dispatched instruction is more recent than a prior instruction identification tag stored in the entry.

Another aspect of the invention relates to a method for recovering processor state. In one embodiment, the method comprises dispatching a plurality of instructions which target architectural registers, a state of the architectural registers being maintained in an architectural register table having a plurality of entries which correspond to the architectural registers; assigning identification tags ("TIDs") to the instructions on dispatch; updating an architectural register table entry with the TID of the most recently dispatched instruction, the entry being associated with the target architectural register of the most recently dispatched instruction; saving data which was stored in the architectural register table entry immediately prior to the updating with the TID of the most recently dispatched instruction by storing the data in an entry in a history buffer table; and recovering the state of the processor in response to an exception event by determining the TID of the instruction associated with the exception event by retrieving data from history buffer entries associated with instructions having TIDs older than the TID associated with the exception event, storing the retrieved data into corresponding entries in the architectural register and flushing the data in the history buffer associated with instructions having TIDs more recent than the TID of the instruction associated with the exception event.

Yet a further aspect of the invention relates to an apparatus for maintaining the architectural state of a processor. In one embodiment, the apparatus comprises means for dispatching an instruction having an identification tag and an associated entry in an architectural register table; and a means for writing the identification tag of the dispatched instruction to the entry of the architectural register table, if the identification tag of the dispatched instruction is more recent than a prior instruction identification tag stored in the entry.

Still a further aspect of the invention relates to an apparatus for recovering processor state. In one embodiment, the apparatus comprises means for dispatching a plurality of instructions which target architectural registers, a state of the architectural registers being maintained in an architectural register table having a plurality of entries which correspond to the architectural registers; means for assigning identification tags ("TIDs") to the instructions on dispatch; means for updating an architectural register table entry with the TID of the most recently dispatched instruction, the entry being associated with the target architectural register of the most recently dispatched instruction; means for saving data which was stored in the architectural register table entry immediately prior to the updating with the TID of the most recently dispatched instruction by storing the data in an entry in a history buffer table; and a means for recovering the state of the processor in response to an exception event by determining the TID of the instruction associated with the exception event by retrieving data from history buffer entries associated with instructions having TIDs older than the TID associated with the exception event, storing the retrieved data into corresponding entries in the architectural register and flushing the data in the history buffer entries associated with instructions having TIDs more recent than the TID of the instruction associated with the exception event.

The tagging scheme described provides a unified mechanism for supporting full out-of-order execution; it allows for the same recovery mechanism to be employed while allowing speculative execution for all of the above described cases.

Predictions can be made regarding branch outcomes, load store conflicts, and register and flag results. In all cases of mispredicted paths, the recovery process uses the dispatch generated tags to selectively purge speculative instructions and results from the machine. The tags also allow any functional unit or queue to dynamically reconstitute the age relationship between any set of instructions; therefore, no completion table is required and first in-first out ("FIFO") management of instruction/result queues is not required to maintain age relationships. The GPR table incorporates GPR future file information in a manner which eliminates the need for an additional architected-to-rename-register mapping table. Furthermore, in contrast to rename schemes which only include a pointer to the rename registers required for execution, in this scheme a dispatched instruction contains pointers to any prior instructions which produce results needed by the dispatched instruction. Finally, unlike rename schemes, instructions and results can be discarded prior to the completion point.

In further aspects, instructions are tagged with tags indicating relative order of dispatching the instructions. In response to dispatching such an instruction, information, including the instruction's tag, is written in an architectural register, wherein the writing may replace information written in response to one of the dispatched instructions dispatched earlier. In response to processing such a tagged and dispatched instruction, information is written to entries in processor resources, including tagging the entries with the instruction's tag, wherein each tag has a value which is globally unique with respect to dispatched instructions for which the processor resource entries have not been released, so that the tagged entries and instructions may be specifically identified.

Also, the information replaced in the architectural registers is saved to a history buffer. Information selected from the history buffer in response to comparing the tags in the history buffer with the tag of an interrupted instruction is restored to the architectural registers. The processor resource entries are released in response to comparing the information tag of the entries with the tag of the interrupted instruction, so that entries may be released for instructions dispatched after the interrupted instruction.

In an additional aspect, the restoring and releasing are in response to the interrupted instruction being interrupted by the following events: a system reset interrupt, machine check interrupt, data access interrupt, instruction access interrupt, external interrupt, alignment interrupt, program execution interrupt, floating point unavailable interrupt, decrementer interrupt, system call, trace exception and floating point assist.

It is one advantage of the invention that the same restoring and releasing are responsive to any one or more of the above listed interruption events.

BRIEF DESCRIPTION OF THE DRAWINGS

FIG. 1 depicts a general purpose register ("GPR") table according to an embodiment of the invention.

FIG. 2 depicts a history buffer table according to an embodiment of the invention.

FIG. 3 depicts a pre-execution queue data structure according to an embodiment of the invention.

FIG. 4 depicts an interrupt stack according to the present invention.

FIGS. 5A–5R depict an illustrative instruction sequence used to illustrate the operation of different embodiments of the invention, and, more particularly, FIG. 5A shows an exemplary sequence of six instructions used to illustrate the operation of one embodiment of the present invention with the dispatch point at the first instruction; FIG. 5B is similar to FIG. 5A, but with instruction 2 dispatched; FIG. 5C is similar to FIG. 5A, but with instruction 3 dispatched; FIG. 5D is similar to FIG. 5A, but with instruction 4 dispatched; FIG. 5E is similar to FIG. 5A, but with instruction 5 dispatched; FIG. 5F is similar to FIG. 5A, but with instruction 6 dispatched; FIG. 5G shows six illustrative instructions similar to FIG. 5A; FIG. 5H shows six illustrative instructions similar to FIG. 5A; FIG. 5I shows six illustrative instructions similar to FIG. 5A; FIG. 5J shows six illustrative instructions similar to FIG. 5A; FIG. 5K shows six illustrative instructions similar to FIG. 5A; FIG. 5L shows six illustrative instructions similar to FIG. 5A; FIG. 5M shows six illustrative instructions similar to FIG. 5A; FIG. 5N shows six illustrative instructions similar to FIG. 5A; FIG. 5O shows; FIG. 5P shows six illustrative instructions similar to FIG. 5A; FIG. 5Q shows six illustrative instructions similar to FIG. 5A; and, FIG. 5R shows six illustrative instructions similar to FIG. 5A.

FIGS. 6A–6R illustrate the operation of the history buffer according to various completion sequences of the example instruction sequence shown in FIG. 5A and, more particularly, FIG. 6A illustrates the state of the history buffer according to the completion sequence shown in FIG. 5A; FIG. 6B illustrates the state of the history buffer according to the completion sequence illustrated in FIG. 5B; FIG. 6C illustrates the state of the history buffer according to the completion sequence illustrated in FIG. 5C; FIG. 6D illustrates the state of the history buffer according to the completion sequence illustrated in FIG. 5D; FIG. 6E illustrates the state of the history buffer according to the completion sequence illustrated in FIG. 5E; FIG. 6F illustrates the state of the history buffer according to the completion sequence illustrated in FIG. 5F; FIG. 6G illustrates the state of the history buffer with instructions 1 and 3 from FIG. 5G issued and completed in that order; FIG. 6H illustrates the state of the history buffer similar to FIG. 5G but with instructions 1, 3, and 4 from FIG. 5H issued and completed in that order; FIG. 6I illustrates the state of the history buffer where the next instruction, instruction 2 in FIG. 5I, is found to be a mispredicted branch; FIG. 6J illustrates the state of the history buffer similar to FIG. 6I but where instruction 2 from FIG. 5J is correctly predicted; FIG. 6K illustrates the state of the history buffer after instructions 1 and 5 from FIG. 5K issue and finish in that order; FIG. 6L illustrates the state of the history buffer similar to FIG. 6K, but with instructions 1, 5 and 4 in FIG. 5L issued and executed in that order; FIG. 6M illustrates the state of the history buffer similar to FIG. 6L but with instructions 1, 5, 4, 3 and 6 issued and executed in that order; FIG. 6N illustrates the state of the history buffer after being flushed; FIG. 6O illustrates the state of the history buffer after instructions 1, 5, 4, 3, and 6 shown in FIG. 5O are properly executed in that order; FIG. 6P illustrates the state of the history buffer after instructions 1 and 2 shown in FIG. 5P are executed; FIG. 6Q illustrates the state of the history buffer similar to FIG. 6P but after execution of instructions 1, 2, and 4 shown in FIG. 5Q; and, FIG. 6R illustrates the state of the history buffer similar to FIG. 6Q, but after execution of instructions 1, 2, 4, and 3 shown in FIG. 5R.

FIGS. 7A–7R illustrate the operation of the GPR table according to various completion sequences of the example instruction sequence shown in FIG. 5A and, more particularly, FIG. 7A illustrates the state of the GPR table according to the sequence shown in FIG. 5A; FIG. 7B illustrates the state of the GPR table according to the sequence shown in FIG. 5B; FIG. 7C illustrates the state of the GPR table according to the sequence shown in FIG. 5C; FIG. 7D illustrates the state of the GPR table according to the sequence shown in FIG. 5D; FIG. 7E illustrates the state of the GPR table according to the sequence shown in FIG. 5E; FIG. 7F illustrates the state of the GPR table according to the sequence shown in FIG. 5F; FIG. 7G illustrates the state of the GPR table with instructions 1 and 3 from FIG. 5G issued and completed in that order; FIG. 7H illustrates the state of the GPR table with instructions 1, 3, and 4 from FIG. 5H issued and completed in that order; FIG. 7I illustrates the state of the GPR table where the next instruction, instruction 2 in FIG. 5I, is found to be a mispredicted branch; FIG. 7J illustrates the state of the GPR table similar to FIG. 7I but where instruction 2 from FIG. 5J is correctly predicted; FIG. 7K illustrates the state of the GPR table after instructions 1 and 5 issue and finish; FIG. 7L illustrates the state of the GPR table similar to FIG. 7K but with instructions 1, 5, and 4 in FIG. 5L issued and executed in that order; FIG. 7M illustrates the state of the GPR table similar to FIG. 7L but with instructions 1, 5, 4, 3 and 6 issued and executed in that order; FIG. 7N illustrates the state of the GPR table after being flushed; FIG. 7O illustrates the state of the GPR table after instructions 1, 5, 4, 3, and 6 shown in FIG. 5O are executed in that order; FIG. 7P illustrates the state of the GPR table after instructions 1 and 2 shown in FIG. 5P execute in that order; FIG. 7Q illustrates the state of the GPR table similar to FIG. 7P but after execution of instructions 1, 2 and 4 shown in FIG. 5Q; and, FIG. 7R illustrates the state of the GPR table similar to FIG. 7Q, but after execution of instructions 1, 2, 4, and 3 shown in FIG. 5R.

FIGS. 8A–8R illustrate the operation of the pre-execution queue ("PEQ") table according to various completion sequences of the example instruction sequence shown in FIG. 5A and more particularly, FIG. 8A illustrates the state of the PEQ table according to the sequence shown in FIG. 5A; FIG. 8B illustrates the state of the PEQ table according to the sequence shown in FIG. 5B; FIG. 8C illustrates the state of the PEQ table according to the sequence shown in FIG. 5C; FIG. 8D illustrates the state of the PEQ table according to the sequence shown in FIG. 5D; FIG. 8E illustrates the state of the PEQ table according to the sequence shown in FIG. 5E; FIG. 8F illustrates the state of the PEQ table according to the sequence shown in FIG. 5F; FIG. 8G illustrates the state of the PEQ table with instructions 1 and 3 from FIG. 5G issued and completed in that order; FIG. 8H illustrates the state of the PEQ table with instructions 1, 3, and 4 from 5H issued and completed in that order; FIG. 8I illustrates the state of the PEQ table where the next instruction, instruction 2 in FIG. 5I, is found to be a mispredicted branch; FIG. 8J illustrates the state of the PEQ table similar to FIG. 8I but where instruction 2 from FIG. 5J is correctly predicted; FIG. 8K illustrates the state of the PEQ table after instructions 1 and 5 issue and finish; FIG. 8L illustrates the state of the PEQ table similar to FIG. 8K but with instructions 1, 5, and 4 in FIG. 5L issued and executed in that order; FIG. 8M illustrates the state of the PEQ table similar to FIG. 8L but with instructions 1, 5, 4, 3 and 6 issued and executed in that order; FIG. 8N illustrates the state of the PEQ table after being flushed; FIG. 8O illustrates the state of the PEQ table after instructions 1, 5, 4, 3, and 6 shown in FIG. 5O are properly executed in that order; FIG. 8P illustrates the state of the PEQ table according to the execution sequence of instructions 1 and 2 shown in FIG. 5P; FIG. 8Q illustrates the state of the PEQ table similar to FIG. 8P but after execution of instructions 1, 2, and 4 shown in FIG. 5Q; and, FIG. 8R illustrates the state of the PEQ table similar to FIG. 8Q, but after execution of instructions 1, 2, 4, and 3 shown in FIG. 5R.

FIGS. 9A–9R illustrate the operation of the interrupt stack according to various completion sequences of the example instruction sequence shown in FIG. 5A and, more particularly, FIG. 9A illustrates the state of the interrupt stack according the sequence shown in FIG. 5A; FIG. 9B illustrates the state of the interrupt stack according the sequence shown in FIG. 5B; FIG. 9C illustrates the state of the interrupt stack according the sequence shown in FIG. 5C; FIG. 9D illustrates the state of the interrupt stack according the sequence shown in FIG. 5D; FIG. 9E illustrates the state of the interrupt stack according the sequence shown in FIG. 5E; FIG. 9F illustrates the state of the interrupt stack according the sequence shown in FIG. 5F; FIG. 9G illustrates the state of the PEQ table with instructions 1 and 3 from FIG. 5G issued and completed in that order; FIG. 9H illustrates the state of the interrupt stack similar to FIG. 9G but with instructions 1, 3, and 4 from 9H issued and completed in that order; FIG. 9I illustrates the state of the interrupt stack where the next instruction, instruction 2 in FIG. 5I, is found to be a mispredicted branch; FIG. 9J illustrates the state of the interrupt stack similar to FIG. 9I but where instruction 2 from FIG. 5J is correctly predicted; FIG. 9K illustrates the state of the interrupt stack instructions 1 and 5 in FIG. 5K issue and finish; FIG. 9L illustrates the state of the interrupt stack similar to FIG. 9K but with instructions 1, 5, and 4 in FIG. 5L issued and executed in that order; FIG. 9M illustrates the state of the interrupt stack similar to FIG. 9L but with instructions 1, 5, 4, 3 and 6 issued and executed in that order; FIG. 9N illustrates the state of the interrupt stack after being flushed;

FIG. 9O illustrates the state of the interrupt stack after instructions 1, 5, 4, 3, and 6 shown in FIG. 5O are properly executed in that order; FIG. 9P illustrates the state of the interrupt stack according to the execution sequence of instructions 1 and 2 shown in FIG. 5P; FIG. 9Q illustrates the state of the interrupt stack similar to FIG. 9P but after execution of instructions 1, 2, and 4 shown in FIG. 5Q; and, FIG. 9R illustrates the state of the interrupt stack similar to FIG. 9Q, but after execution of instructions 1, 2, 4 and 3 shown in FIG. 5R.

FIG. 11 depicts a branch queue ("BRQ") according to an embodiment of the invention.

FIG. 13 is an exemplary instruction sequence for illustrating the operation of an embodiment of the invention.

FIG. 14 is a GPR table according to an embodiment of the invention.

FIG. 15 is a history buffer table according to an embodiment of the invention.

FIG. 16 is a PEQ buffer according to an embodiment of the invention.

FIG. 17 is an interrupt stack according to an embodiment of the invention.

FIG. 18 is a GPR table updated from the table shown in FIG. 14 according to an embodiment of the invention.

FIG. 19 is a history buffer table updated from the history buffer table shown in FIG. 15 according to an embodiment of the invention.

FIG. 20 is a PEQ structure updated from the PEQ structure shown in FIG. 16 according to an embodiment of the invention.

FIG. 21 is an interrupt stack updated from the interrupt stack shown in FIG. 17 according to still a further embodiment of the invention.

DETAILED DESCRIPTION OF THE EMBODIMENT THE INVENTION

Figure 10:
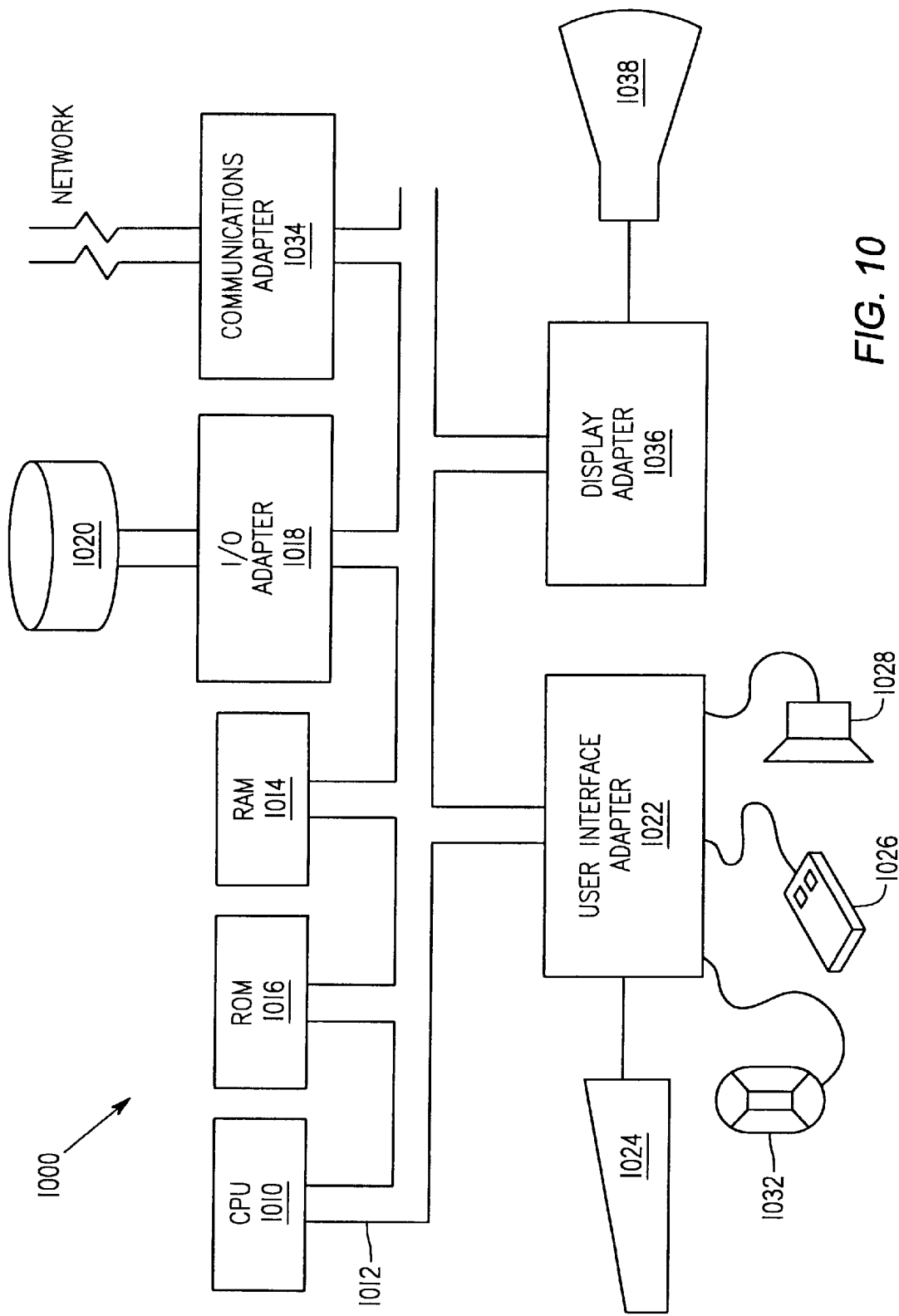
FIG. 10 is a block diagram of an exemplary data processing system which may be used for the invention.

Referring first to FIG. 10, an example is shown of a data processing system 1000 which may be used for the invention. The system has a central processing unit (CPU) 1010, such as a PowerPC microprocessor ("PowerPC" is a trademark of IBM Corporation) according to "The PowerPC Architecture: A Specification for a New Family of RISC Processors", 2d edition, 1994, Cathy May, et al. Ed., which is hereby incorporated herein by reference. A more specific implementation of a PowerPC microprocessor is described in the "PowerPC 604 RISC Microprocessor User's Manual", 1994, IBM Corporation, which is hereby incorporated herein by reference. The history buffer (not shown) of the present invention is included in CPU 1010. The CPU 1010 is coupled to various other components by system bus 1012. Read only memory ("ROM") 1016 is coupled to the system bus 1012 and includes a basic input/output system ("BIOS") that controls certain basic functions of the data processing system 1000. Random access memory ("RAM") 1014, I/O adapter 1018, and communications adapter 1034 are also coupled to the system bus 1012. I/O adapter 1018 may be a small computer system interface ("SCSI") adapter that communicates with a disk storage device 1020. Communications adapter 1034 interconnects bus 1012 with an outside network enabling the data processing system to communicate with other such systems. Input/Output devices are also connected to system bus 1012 via user interface adapter 1022 and display adapter 1036. Keyboard 1024, track ball 1032, mouse 1026 and speaker 1028 are all interconnected to bus 1012 via user interface adapter 1022. Display monitor 1038 is connected to system bus 1012 by display adapter 1036. In this manner, a user is capable of inputting to the system throughout the keyboard 1024, trackball 1032 or mouse 1026 and receiving output from the system via speaker 1028 and display 1038. Additionally, an operating system such as the AIX operating system ("AIX" is a trademark of the IBM Corporation) is used to coordinate the functions of the various components shown in FIG. 10.

Figure 12:
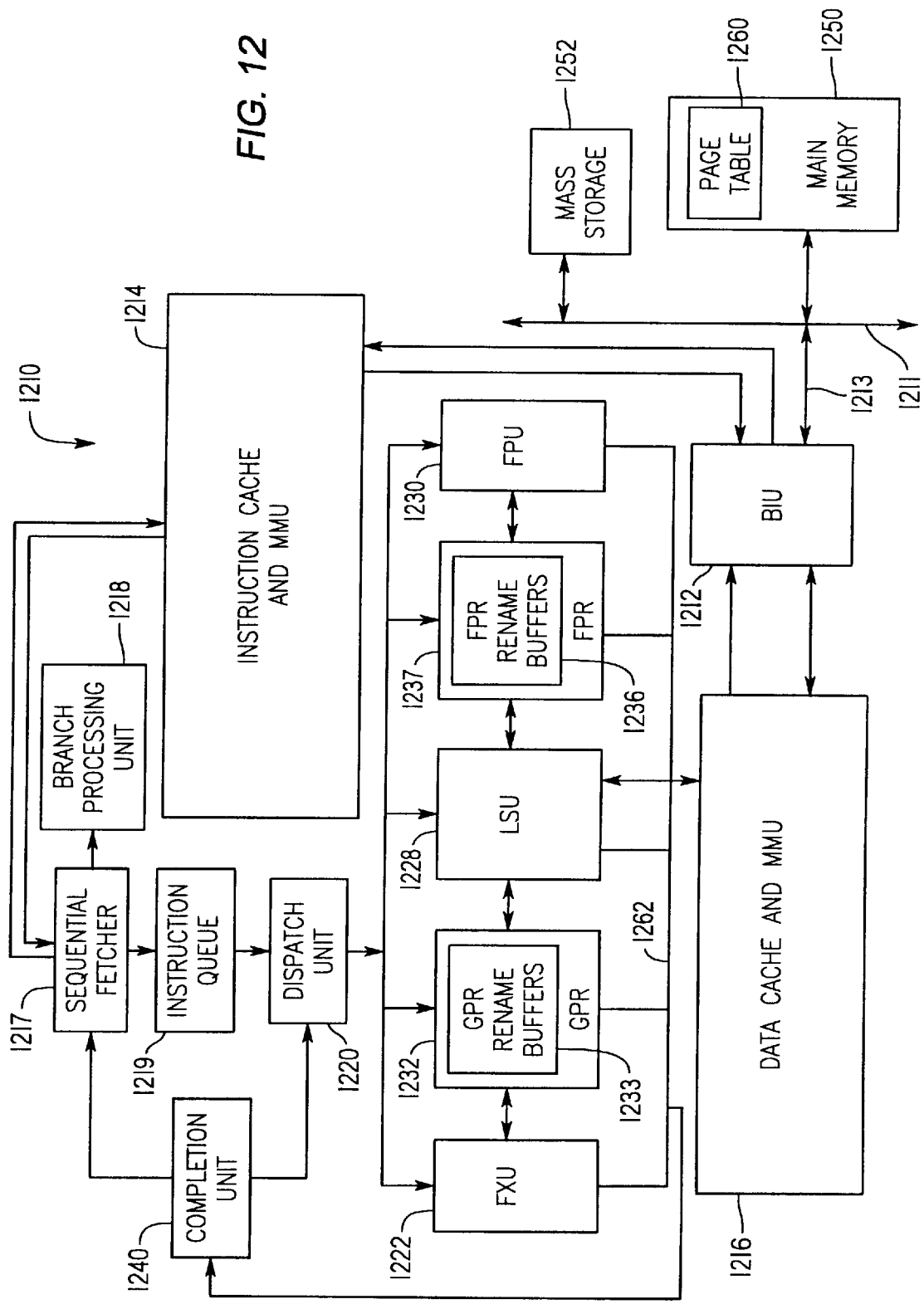
FIG. 12 is a block diagram of a processor system useful with embodiments of the invention.

With reference now to the figures and in particular with reference to FIG. 12, there is depicted a block diagram of an illustrative embodiment of a data processing system for processing information in accordance with the invention recited within the appended claims. In the depicted illustrative embodiment, processor 1210 comprises a single integrated circuit superscalar microprocessor. Accordingly, as discussed further below, processor 1210 includes various execution units, registers, buffers, memories, and other functional units, which are all formed by integrated circuitry. Processor 10 preferably comprises one of the PowerPC™ line of microprocessors available from IBM Microelectronics, which operates according to reduced instruction set computing (RISC) techniques; however, those skilled in the art will appreciate from the following description that other suitable processors can be utilized. As illustrated in FIG. 12, processor 1210 is coupled to system bus 1211 via bus interface unit (BIU) 1212 and processor bus 1213, which like system bus 1211 includes address, data, and control buses. BIU 1212 controls the transfer of information between processor 1210 and other devices coupled to system bus 1211, such as main memory 1250 and nonvolatile mass storage 1252, by participating in bus arbitration. The data processing system illustrated in FIG. 12 preferably includes other unillustrated devices coupled to system bus 1211, which are not necessary for an understanding of the following description and are accordingly omitted for the sake of simplicity.

BIU 1212 is connected to instruction cache and MMU (Memory Management Unit) 1214 and data cache and MMU 1216 within processor 1210. High-speed caches, such as those within instruction cache and MMU 1214 and data cache and MMU 1216, enable processor 1210 to achieve relatively fast access times to a subset of data or instructions previously transferred from main memory 1250 to the caches, thus improving the speed of operation of the data processing system. Data and instructions stored within the data cache and instruction cache, respectively, are identified and accessed by address tags, which each comprise a selected number of high-order bits of the physical address of the data or instructions in main memory 1250. Instruction cache and MMU 1214 is further coupled to sequential fetcher 1217, which fetches instructions for execution from instruction cache and MMU 1214 during each cycle. Sequential fetcher 1217 transmits branch instructions fetched from instruction cache and MMU 1214 to branch processing unit (BPU) 1218 for execution, but temporarily stores sequential instructions within instruction queue 1219 for execution by other execution circuitry within processor 1210.

In the depicted illustrative embodiment, in addition to BPU 1218, the execution circuitry of processor 1210 comprises multiple execution units for executing sequential instructions, including fixed-point-unit (FXU) 1222, load-store unit (LSU) 1228, and floating-point unit (FPU) 1230. Each of execution units 1222, 1228 and 1230 typically executes one or more instructions of a particular type of sequential instructions during each processor cycle. For example, FXU 1222 performs fixed-point mathematical and logical operations such as addition, subtraction, ANDing, ORing, and XORing, utilizing source operands received from specified general purpose registers (GPRs) 1232. Following the execution of a fixed-point instruction, FXU 1222 outputs the data results of the instruction to GPR buffers 1232, which provide storage for the result received on result bus 1262. Conversely, FPU 1230 typically performs single and double-precision floating-point arithmetic and logical operations, such as floating-point multiplication and division, on source operands received from floating-point registers (FPRs) 1236. FPU 1230 outputs data resulting from the execution of floating-point instructions to selected FPR buffers 1236, which store the result data. As its name implies, LSU 1228 typically executes floating-point and fixed-point instructions which either load data from memory (i.e., either the data cache within data cache and MMU 1216 or main memory 1250) into selected GPRs 1232 or FPRs 1236 or which store data from a selected one of GPRs 1232 or FPRs 1236 to memory.

Processor 1210 employs both pipelining and out-of-order execution of instructions to further improve the performance of its superscalar architecture. Accordingly, instructions can be executed by FXU 1222, LSU 1228, and FPU 1230 in any order as long as data dependencies are observed. In addition, instructions are processed by each of FXU 1222, LSU 1228, and FPU 1230 at a sequence of pipeline stages. As is typical of high-performance processors, each sequential instruction is processed at five distinct pipeline stages, namely, fetch, decode/dispatch, execute, finish, and completion.

During the fetch stage, sequential fetcher 1217 retrieves one or more instructions associated with one or more memory addresses from instruction cache and MMU 1214. Sequential instructions fetched from instruction cache and MMU 1214 are stored by sequential fetcher 1217 within instruction queue 1219. In contrast, sequential fetcher 1217 removes (folds out) branch instructions from the instruction stream and forwards them to BPU 1218 for execution. BPU 1218 includes a branch prediction mechanism, which in one embodiment comprises a dynamic prediction mechanism such as a branch history table, that enables BPU 1218 to speculatively execute unresolved conditional branch instructions by predicting whether or not the branch will be taken.

During the decode/dispatch stage, dispatch unit 1220 decodes and dispatches one or more instructions from instruction queue 1219 to execution units FXU 1222, LSU 1228, and FPU 1230, typically in program order. In a more conventional processor, dispatch 130 unit 1220 allocates a rename buffer within GPR rename buffers 1233 or FPR rename buffers 1237 for each dispatched instruction's result data, and at dispatch, instructions are also stored within the multiple-slot completion buffer of completion unit 1240 to await completion. However, as will be seen herein, the present invention is adaptable to embodiments which require neither rename registers or completion units. According to the depicted illustrative embodiment, processor 1210 tracks the program order of the dispatched instructions during out-of-order execution utilizing unique instruction identifiers.

During the execute stage, execution units FXU 1222, LSU 1228, and FPU 1230 execute instructions received from dispatch unit 1220 opportunistically as operands and execution resources for the indicated operations become available. In one embodiment, each of execution units FXU 1222, LSU 1228, and FPU 1230 are equipped with a reservation station that stores instructions dispatched to that execution until operands or execution resources become available. After execution of an instruction has terminated, execution units FXU 1222, LSU 1228, and FPU 1230 store data results, if any, within either GPRs or FPRs, depending upon the instruction type. In more conventional processors, execution units FXU 1222, LSU 1228, and FPU 1230 notify completion unit 1240 which instructions have finished execution. Finally, instructions are completed in program order out of the completion buffer of completion unit 1240. Instructions executed by FXU 1222 and FPU 1230 are completed by transferring data results of the instructions from GPR rename buffers 1233 and FPR rename buffers 1237 to GPRs 1232 and FPRs 1236, respectively. Load and store instructions executed by LSU 1228 are completed by transferring the finished instructions to a completed store queue or a completed load queue from which the load and store operations indicated by the instructions will be performed.

However, in various embodiments, the invention utilizes the dispatch logic of the processor to "tokenize" a classical Von Neumann instruction stream into a data flow-style format. Thus, data dependencies are not handled by tracking the storage location of source data required by each instruction, as in register renaming, but rather by associating with an instruction certain information which enables tracking source data by reference to another instruction which is to provide the source data. Accordingly, the processor is provided with a target identification ("TID") generator which generates tokens, or tags, each of which is uniquely associated with an instruction upon dispatch. The TIDs are used to retain program order information and track data dependencies.

According to the terminology used herein, when an instruction performs an operation affecting the contents of a register, the operation is said to "target" that register, the instruction may be referred to as a "targeting instruction", and the register is referred to as a "target register" or a "targeted register". For example, the instruction "ld r3, . . . " targets register r3, and r3 is the target register for the instruction "ld r3, . . . ".

If multiple instructions with the same target register have been dispatched, the last one dispatched writes the architected register. Each such instruction is assigned a unique result tag associated with the target register at dispatch. In this embodiment, the result tag is not required to indicate the age of the instruction, but merely to distinguish the instructions associated with particular registers. When an instruction with target registers is dispatched, the result tag will be written into a tag field associated with the target register, and either the prior target register content or the prior result tag is retrieved from the register and stored in a history buffer entry (HBE) allocated for it. When it becomes known that the speculatively executed instruction will not be aborted, the HBE is retired (deallocated). However, if the speculatively executed instruction needs to be aborted, register contents or result tags saved in HBE's are copied back to the register and the HBE's are retired. See related applications for further details.

The invention also uses a history buffer, rather than register renaming, for recovering processor state. According to the invention, the architected registers, i.e., GPRs, maintain the "future state" of the processor, and the history buffer entries contain the information required to "back-out" the speculative GPR updates all the way back to the current architecturally committed state as in the event of an interrupt. In contrast, register rename schemes typically maintain the architecturally committed state in the GPRs and the speculative updates are kept in the rename registers. The rename schemes typically incorporate a completion table, a program ordered list of all instructions which have been dispatched but not yet committed.

In one embodiment, the TID is a monotonically increasing tag which is used by the processor to determine the relative age of dispatched instructions. In a more specific embodiment, the TID comprises a six bit field which is appended to each instruction along with a global "wrap" bit. By exclusive ORing ("XOR") the wrap bit with the high order bit of each assigned TID, the range of allowable TIDs can be managed as two halves, or pools of available TIDs. By the time all of the TIDs in one pool, e.g., the half of the allowable range of TIDs in which the upper bit is one, have been assigned, it is likely that all the instructions which have TIDs in the other pool, i.e., those in which the upper bit is zero, will have completed and recorded their results. When all of the TIDs from the first half are no longer in use, the wrap bit is toggled. Thus, the instructions which are outstanding effectively move into the TID pool from the first half of the range, and the second half of the range is now available. This mechanism guarantees that the TIDs always appear to be monotonically increasing values even though only 6 bits are available for a TID tag.

The dispatch unit in the present invention not only assigns TIDs and dispatches instructions, but also updates various tables which are used to track the status of the dispatched instructions. In one embodiment of the invention, four tables or queues, are used to track the dispatched instructions, update the architectural registers, and restore program order in the event of an exception. FIGS. 1–4 depict an illustrative embodiment of the tables.

Referring now to FIG. 1, there is depicted a first queue which will be referred to as the GPR table. As shown, the illustrative GPR table comprises a plurality of entries, each entry being associated with a particular architectural register. In this specific embodiment, there are 32 entries, one for each general purpose register ("GPR") available in the exemplary PowerPC Architecture. It will be understood by those skilled in the art that a similar table could easily be provided in other embodiments of the invention for the floating-point registers ("FPRs") or any other registers which are intended to operate in accordance with the present invention.

Each entry in the GPR table consists of four fields. The first field is the valid/tagged field 100. This field has two permissible values, valid and tagged. In one specific embodiment of the invention, this field comprises a single bit which is either high or low depending on the status of the data stored in the second and third fields, the value field 102 and TID field 104. Specifically, upon dispatching of an instruction which targets a register, the dispatch unit sets the field 100 to indicate "tagged". Specifically, if the data in valid/tagged field 100 indicates "valid" then the second field contains the "current" value of the associated GPR. The current value is the value that would be contained in the associated GPR if all instructions which issued prior to the instruction presently being executed had completed and the results had updated the GPRs. In this case, the data in value field 102 may be passed to other resources on the processor, and the data in TID field 104 is considered meaningless.

Alternately, if the value of the valid/tagged field 100 indicates "tagged" then the data in value field 102 is meaningless and TID field 104 contains the TID of the instruction which is the most recently dispatched but not yet executed instruction which targets an associated GPR.

The fourth field 106 is used to provide compression of history buffer entries. Specifically, a history buffer entry is consumed only if a copy of the associated register (since the last interrupt stack entry) is not already present in the history buffer table. This will be described further herein. Of course, numerous methods will occur to those of skill in the art to compress the number of history buffer entries depending on the particular implementation of the invention.

FIG. 2 depicts a history buffer table according to an embodiment of the present invention. The history buffer table comprises a plurality of entries which are written into the history buffer table chronologically. Each entry comprises five fields, namely, instruction TID field 108, the architected register field 110, the valid/tagged field 112, the value field 114 and the TID field 116. Each time an instruction which targets a GPR is dispatched, a history buffer table entry is created if the fourth field 106 of the GPR table indicates that the targeted register has not been written since the most recent interrupt stack entry (creation of interrupt stack entries and entries for GPR field 106 are described further herein). Of course, it is understood that this is simply to conserve history buffer table entries, and if desired, a history buffer entry could be created for each GPR setting instruction, without regard to field 106 of the GPR table.

Instruction TID field 108 contains the TID of the instruction being dispatched. This TID value is used to determine when various operations may be performed on the data stored in the history buffer table. For example, instruction TID field 108 is used to determine when the entry can be discarded, when the entry can be flushed, e.g., the entry was created for an instruction on a mis-predicted branch, and whether the entry contains a value required to update the GPR during recovery situations. The architected register field 110 identifies the GPR being updated by the dispatched instruction, i.e., the target register. During recovery, this field is used to index the GPR file.

The valid/tagged field 112, value field 114 and TID field 116 all contain data related to the architected register targeted by the dispatched instruction. In one embodiment, these fields are copied directly from valid/tagged field 100, value field 102 and TID field 104 from the GPR table entry associated with the architected register identified in architected register field 110 when the history buffer table entry is created.

FIG. 3 depicts a table for tracking the source data required by a dispatched instruction. This table tracks whether the source data is available and holds the data until the instruction is issued, and is also referred to as a reservation station. In one embodiment, this table is implemented as two identical tables, referred to as the pre-execution queue ("PEQ") and the store pre-execution queue ("SPQ"), respectively. The SPQ receives all store instructions, "complex" instructions such as sync and cache operations, and all fixed-point multiply/divide instructions. The PEQ receives all of the remaining fixed-point instructions. However, for present purposes it is sufficient to discuss the operation of the invention with respect to only one of these tables which will be referred to generically as the PEQ table. It will be understood by those of skill in the art how other similar execution queues will be constructed depending on the type of instructions and the particular architecture involved.

As shown in FIG. 3, the PEQ table comprises a plurality of entries. Each entry contains nine fields, namely, the TID field 118, the opcode field 120, destination field 122 and two source blocks, each source block comprising a valid/tagged field 124a–b, value fields 126a–b and TID fields 128a–b.

On dispatch, the dispatch unit passes instruction data into an entry in the PEQ. The TID field 118 contains the TID which was assigned to the dispatched instruction. Opcode field 120 contains the operational code of the dispatched instruction, and destination field 122 contains the destination register specifier. Source blocks 1 and 2 contain valid/tagged, value and TID information for the instruction, or instructions, which will produce the source data required by the instruction associated with the PEQ entry. If one or more source registers are specified by the instruction code, values from the valid/tagged 100, value 102 and TID fields in the GPR table entry corresponding to the source register, or registers, are copied into the similarly named fields in the PEQ entry for the dispatched instruction. If only one source register is specified by the instruction code, then the data from the GPR table is copied into fields 124a–128a. If a second source register is specified, then data is copied into fields 124b–128b.

Since the number of source registers is instruction dependent, one preferred embodiment associates a "source needed" bit with each source block. If the instruction entered in the PEQ requires data from that set of source fields, the source needed bit is set.

To illustrate the operation of the PEQ, it will be assumed that only one source register is required by the instruction associated with the PEQ entry. Thus, the source needed bit for source block one is set, and the source needed bit for source block two is low. If the valid/tagged field 124a indicates that the data in value field 126a is valid, then the instruction stored in the PEQ entry is ready to be issued for execution. However, if the valid/tagged field 124a indicates that the value is tagged, then the PEQ structure, via the control logic associated with the PEQ structure, "snoops" the result busses from the various functional units of the processor. In the illustrative embodiment of the invention, the execution units broadcast their results along with the TID of the instruction which generated them. When a TID being broadcast matches the TID value in the source TID field 128a, the GPR value being broadcast is copied into value field 126a and the valid/tagged field 124a is set to indicate valid. The instruction associated with the entry may then be issued to the appropriate functional unit.

Referring now to FIG. 4, another table used in the present embodiment to the invention is the interrupt stack (referred to also in related applications as an interruptable instruction table "IIT"). As instructions are dispatched, information about each instruction is recorded on the interrupt stack. However, in more particular embodiments of the invention, the size of the interrupt stack may be reduced by storing only information for interruptible, e.g., load, store, trap, etc., instructions. In one more specific embodiment, any instruction for which a prediction is made to allow speculative execution beyond the subject instruction are also stored on the interrupt stack. In the following, emphasis is placed on interruptions arising from speculative execution of instructions. However, as mentioned previously, an interruption may also be caused by an unusual condition arising in connection with instruction execution, error, or signal external to the processor 210. For example, such an interruption may be caused by 1) attempting to execute an illegal or privileged instruction, 2) executing an instruction having an invalid form, or an instruction which is optional within the system architecture but not implemented in the particular system, or a "System Call" or "Trap" instruction, 3) executing a floating-point instruction when such instructions are not available or require system software assistance, 4) executing a floating-point instruction which causes a floating-point exception, such as due to an invalid operation, zero divide, overflow, underflow, etc., 5) attempting to access an unavailable storage location, including RAM 214 or disk 220, 6) attempting to access storage, including RAM 214 or disk 220, with an invalid effective address alignment, or 7) a System Reset or Machine Check signal from a device (not shown) directly connected to the processor 210 or another device in the system 200 connected to the processor 210 via the bus 212. The conditions are discussed further in the above references, "The PowerPC Architecture: A Specification for a New Family of RISC Processors", and "PowerPC 604 RISC Microprocessor User's Manual". Such instructions can involve control flow predictions, such as predicted outcomes for branches, or data flow predictions, such as predicted results such as bit flags. The interrupt stack comprises a plurality of entries, each entry having a TID field 129, an address field 130 and a done field 132. The TID field contains the TID of the instruction being dispatched. The address field contains the address of the instruction in storage, so that the instruction may be re-fetched if a restart is required. The done field 132 indicates whether the instruction has completed, and if so, whether an exception has occurred. The preferred embodiment posts the done field results during the cycle of execute; however, to alleviate cycle time pressures (including checks for load-hit-store and store-hit-load conditions), the posting can be delayed. In one or more of the related applications, the done field is reduced to a number of components, such as a finished bit and an exception field.

For purposes of the present discussion, the invention will be described in more detail in the context of a single instruction being dispatched at a time. However, it will be understood that the invention is not limited to dispatching one instruction per cycle. In other embodiments, the operations are performed serially in the same cycle for a plurality of instructions. In such an embodiment, the operations would appear independent from the stand point of the hardware required to perform them. However, in still further embodiments, additional hardware is provided so that the multiple operations can be performed in parallel to decrease cycle time. The resulting cumulative set of updates would provide the same results as the sequential update implementation.

The additional hardware required to support parallel dispatch in general would include providing additional read/ write polls on the tables shown in FIGS. 1–4, modifying the logic which checks for sufficient room in a table/queue to account for logically earlier instructions in same "dispatch window," i.e., group of instructions being considered for dispatch in the same cycle, and modifying the logic which examines the GPR table to determine how the source fields should be set in the PEQ table to allow consideration of the fact that each source could also be generated by earlier instructions in the same dispatch window, in which case the TID for the most recent of these instructions should be placed in the source field and the valid/tagged field should be set to tagged.

When an instruction is dispatched, the present invention first determines whether sufficient resources are available for operation and if so, the invention loads the appropriate table entries and removes the instruction from the main too instruction queue. These steps will be discussed in greater detail herein with reference to FIGS. 5A–9R.

Determining whether sufficient resources are available first involves determining the type of instruction to be dispatched and then checking the appropriate tables for sufficient available entries. Specifically, instructions which set a GPR (referred to as "GPR setting" or "targeting" instructions) require an entry in the PEQ table. Further, GPR setting instructions also normally require an entry in the history buffer table for each GPR being set. It will be understood, however, that not every GPR setting instruction will require an entry in the history buffer table due to the history buffer compression using the fourth field of the GPR table as discussed previously. Various compression techniques may be used in different embodiments of the invention, but for purposes of clarity, the invention will be described as though every GPR setting instruction requires a history buffer or table entry. Interruptible instructions, e.g., loads, stores, traps, etc., unresolved or predicted branch instructions, and potential summary overflow flag setting instructions require an entry on the interrupt stack.

If sufficient entries are available in the appropriate tables for the type of instruction to be dispatched, then the processor determines whether a TID is available for the instruction being considered for dispatch. It will be understood that for some instructions, such as load with update, two TIDs are required, and for other instructions, such as load multiple and load string, multiple TIDs may be required.

In one embodiment, with the exception of load multiple and load string, all of the resources needed for an instruction must be available or the instruction is ineligible for dispatch. Load multiple and load string instructions, which are logically segmented into individual load operations, can be dispatched piece-meal. In one specific embodiment, load multiple and load string instructions are left in the main instruction queue until all of the resources for all of the logical segments have been allocated.

Store instructions also require one or more entries in the store data queue. The store data queue is described in the PowerPC Manual discussed supra, and is not necessary to an understanding of the present invention. In still other embodiments, store multiple and store string instructions can also be dispatched in piece-meal fashion based on the availability of store data queue entries, in a fashion similar to the load multiple and load string instructions.

Once it is determined that sufficient resources exist to dispatch the instruction, the tables are updated. This will be explained in greater detail with respect to the example instruction sequence shown in FIGS. 5A–5R. FIG. 5A shows an exemplary sequence of six instructions which will be used to illustrate the operation of one embodiment of the present invention. As shown, each instruction is assigned a TID tag from one to six in numerical order. The dispatch point of the dispatcher is indicated by the arrow shown to the left of the TID column. The mnemonic for the instruction is shown in the column to the right of the TID column. These mnemonics are taken from the instruction set of the PowerPC Architecture which is described in detail in "PowerPC Microprocessor Family: The Programming Environment," available from IBM Microelectronics, MPRPPCFPE-01, incorporated herein by reference. The rightmost column of FIG. 5A identifies the registers, or other operands, which will be affected by the instruction.

In FIG. 5A, the first instruction, having a TID of 1, has been dispatched and the dispatch point has been moved to instruction 2. Instruction 1 is an add immediate and record ("ai."), which adds a scalar value of 1 to the data in general purpose register 4 and stores the result back into register 4. Since instruction 1 is a GPR setting instruction, not an interruptible instruction, the history buffer table, GPR table, and PEQ table will all be updated when instruction 1 is dispatched as illustrated in FIGS. 6A–8A. Instruction 1, being a PowerPC record type operation, also sets field 0 of the condition code register. This is the field tested by the branch labeled instruction 2. Note that the same TID value can be used to indicate the dependency of instruction 2 on instruction 1 as is used to indicate the dependency of instruction 4 on instruction 1. A branch waiting in the branch request queue ("BRQ") for resolution will snoop by inspecting the functional unit's broadcast TID value and will grab the bits on the resultant condition register bus when a TID match is found; the PEQ will snoop by inspecting the same functional unit's broadcast TID value, but it will grab the value on the resultant GPR bus when a TID match is found.

FIG. 6A shows the history buffer after the dispatch of instruction 1. In this case, since instruction 1 targets register 4, the data in register 4 prior to dispatch is stored in the value field of the history buffer. In the figure this is identified simply as "old value." The valid/tagged field of the history buffer is set to valid, illustrated in the figure by "V", to indicate that the previous instruction which set register 4 has already completed, and the data is available for use by any instruction which was issued prior to instruction 1. The architectural register field, indicated as "reg" in the figure, is written with the number of the architectural register which provided the valid/tagged and value data. The instruction TID field of the history buffer is updated with the TID of the dispatched instruction, in this case, 1. Since the data in the value field is valid, the TID field is meaningless.

FIG. 7A shows the GPR table after the dispatch of instruction 1. Since instruction 1 sets register 4, the GPR table entry 709, associated with GPR register 4, is updated. At this point, instruction 1 has not completed and its results are, therefore, unavailable. Thus, the valid/tagged field of GPR table entry 708 is set as tagged, indicated by a "T" in the valid/tagged field. Since the entry is listed as tagged, the data in the value field of the GPR table is meaningless. The TID field of GPR table entry 708 is updated with the TID of instruction 1. The fourth field of the GPR table used to compress the history buffer entries has been omitted for clarity.

FIG. 8A depicts the PEQ table after the dispatch of instruction 1. PEQ entry 800 is updated with the source and destination information of instruction 1 as follows. The TID field of entry 800 of the PEQ table is updated with the TID of the dispatched instruction, i.e., 1. The opcode field is updated with the opcode of the instruction. It will be understood that in practice the actual opcode is written into the PEQ table, however, for purposes of illustration, the opcode will be represented by its mnemonic character, here "ai." The destination field of the entry in the PEQ table is updated with the GPR register targeted by the instruction, in this case register 4. The PEQ entries comprise two source blocks, source 1 and source 2, each source block comprising a valid/tagged, value and TID field. In this case, the source data required for instruction 1 is the data stored in GPR register 4. Since, in this illustration, all instructions prior to instruction 1 are deemed to be completed, the data in register 4 is valid and this is indicated in valid/tagged field of source block 1 of entry 800. Current data in register 4, i.e., the data before the dispatch of instruction 1, is loaded into the value field of source block 1, and the data in the TID field of source block 1 is meaningless. Source block 2 contains the immediate value 1. In a further embodiment, the source needed bit is set in source block 1; the data required by instruction 1 is valid and stored in the value field. Similarly, the source needed bit in source block 2 is set because the immediate value is used by instruction 1. Instruction 1 is an non-interruptible instruction. Therefore, no entry is made into the interrupt stack shown in FIG. 9A.

Referring now to FIG. 5B, instruction 2, having TID 2, is now dispatched and the dispatch pointer moved to instruction 3. Instruction 2 is a branch conditional instruction to the address stored in label 1 depending on the status of condition register 0. Instruction 2 is not a GPR setting instruction, therefore no change is made to the history buffer table, GPR table, or PEQ table. However, since instruction 2 is an interruptible instruction, entry 900 is created in the interrupt stack as shown in FIG. 9B. The TID field of entry 900 is updated with the TID of instruction 2, i.e., 2, and the address field is updated with the address of instruction 2 in memory. This is depicted as "addr(bc)", as in the figure. At the same time, the branch conditional instruction is sent to the branch request queue ("BRQ") and marked as dependent on instruction 1. FIG. 11 depicts a branch queue according to an embodiment of the invention. The branch queue is also known as a reservation station. The operational logic of the branch queue is similar to the PEQ snooping logic, if the "used/not used" bit is set to "not used", this field is ignored. Otherwise, the valid/tagged value indicates whether the "value" field is valid or if the "TID" field is valid. If the TID field is valid, and a TID match is found to be broadcast on a result bus, the appropriate data bus value is placed in the "value" field and the "valid/tagged" bit is set to indicate "valid". The execution of the instruction in the BRQ can be initiated when its "used" source fields are marked valid. Execution consists of determining whether the predicted outcomes match the actual outcomes. If all predictions were correct, the branch instruction is marked "done" in the interrupt stack and discarded from the processor. If any prediction was incorrect, a flush command is generated for the branch instruction.

Next, referring to FIGS. 5C–9C, instruction 3 is dispatched and the tables are updated as shown in FIGS. 5C–9C. Instruction 3 is a store instruction which stores the contents of the low order 32 bits of register 3 into the memory location addressed by the effective address stored in register 2. While instruction 3 does not write to a GPR, it does rely on GPR values for source data. Therefore, it cannot be issued until these resources have become available. Consequently, entry 802 is created in the PEQ. The TID, 3, for the instruction is entered into the TID field of entry 802. The opcode for instruction 3 is entered into the opcode field, and since there is no GPR destination, the destination field of PEQ entry 802 is meaningless. The source data required to execute instruction 3 is stored in registers 2 and 3. Since the data in these registers is valid, the valid/tagged fields for both source blocks in entry 802 is set to valid, and the value field in each of the source blocks is written with the data from registers 2 and 3. Since a store is an interruptible instruction, entry 902 is created in the interrupt stack as shown in FIG. 9C. This entry contains the TID 3, of instruction 3, and the address in memory of the store instruction.

FIG. 5D now shows the instruction sequence after the dispatch of instruction 4. Instruction 4 is a load instruction which causes a word in memory located at an address determined by register 4 to be retrieved from memory and written back into register 4. Since this instruction obviously affects register 4, an entry 602 is created in the history buffer as shown in FIG. 6D. As before, the instruction TID and architectured register fields of the history buffer are written with the TID and target register of instruction 4. The valid/tagged field, value field and TID field are retrieved from the data stored in the GPR table shown in FIG. 7D, before entry 708 is modified by instruction 4. More specifically, prior to the dispatch of instruction 4, the data in GPR table entry 708 was awaiting completion of instruction 1. Thus, the data was marked as tagged with the TID 1. This data is written into the history buffer in entry 602 in the valid/tagged and TID fields, respectively. The value field in entry 602 is meaningless.

Once the data from GPR entry 708 is stored in history buffer entry 602, entry 708 is overwritten with data corresponding to the most recent register 4 setting instruction, i.e., instruction 4. Since instruction 4 has recently dispatched, and has not completed, the data is marked tagged and the TID field is updated with TID 4.

Since instruction 4 is both bound for an execution unit associated with the PEQ and an interruptible instruction, entries 804 and 904 are created in the PEQ and interrupt stacks, respectively. As shown in FIG. 8D, PEQ entry 804 is written with the TID, opcode, and destination register information of instruction 4. The source data required for execution of instruction 4 is not yet available because instruction 1 has not yet completed. Thus, for source block 1 of entry 804, the valid/tagged field is marked tagged and the TID field is written with a number 1. Only one register source is required by instruction 4; the source 2 field is provided with the immediate value of eight, i.e. the displacement value. It will be appreciated that if instruction 1 had executed prior to dispatching instruction 4, the GPR table entry for register 4 would have been updated and the history buffer and PEQ table would be loaded with valid rather than tagged values. Entry 904 is created to store the TID and address of instruction 4.

Referring now to FIG. 5E, the instruction sequence is shown after the dispatch of instruction 5. Instruction 5 is an add instruction which sums the contents of registers 1 and 2 and stores the results back into register 2. Since instruction 5 sets register 2, the data stored in register 2 prior to the dispatch of the instruction is copied into the history buffer as shown in FIG. 6E. In this case, the data is valid and the old value, i.e., the data stored in GPR table entry 704 prior to the dispatch of instruction 5, which is the same value as prior to the dispatch of instruction 1, is written into the value field of history buffer entry 604. Since the data is marked valid in the valid/tagged field, the data stored in the TID field of history buffer entry 604 is meaningless. The instruction TID field and an architectured register field are updated with the TID and destination register of instruction 5.

GPR table entry 704, corresponding to architectured register 2, is updated with data from instruction 5. Since instruction 5 has not been executed, the valid/tagged field is marked tagged and the TID field is written with TID 5. The value field is meaningless.

Referring now to FIGS. 8E and 9E, it is seen that PEQ entry 806 is created for instruction 5. The TID opcode and destination fields of entry 806 are updated with data from instruction 5. Data from source 1 and source 2 fields are required for the execution of instruction 5. In this case, data is provided from GPR registers 1 and 2 which both contain valid information prior to the dispatch of instruction 5. Thus, the valid/tagged field and value fields for source blocks 1 and 2 of entry 806 are updated appropriately. The TID fields are meaningless. Since an add instruction is an non-interruptible instruction, no entry is created in the interrupt stack for instruction 5.

FIG. 5F shows the exemplary instruction sequence after the dispatch of instruction 6. Instruction 6 is an add extended instruction which sets the overflow exception enable ("OE") bit. This instruction sums the data in register 4 with itself and stores the result in register 3. Since instruction 6 sets GPR register 3, entry 606 in the history buffer is created to store the data in register 3 prior to the dispatch of instruction 6. This data was previously valid, so the valid/tagged field is set to valid and the value field is updated with the data from register 3. The instruction TID and architectured register fields for entry 606 are updated as discussed previously with respect to earlier instructions. Referring now to FIG. 7F, GPR entry 706, corresponding to register 3, is updated with the data from instruction 6. Again, instruction 6 has not executed therefore the data is marked as tagged, and the TID of instruction 6 is stored in the TID field of entry 706.

FIG. 8F shows the PEQ field after dispatch of instruction 6. Entry 808 has been created and updated with the TID, opcode and destination of instruction 6. The source 1 and source 2 blocks required for execution of instruction 6 are retrieved from the GPR table entry 708. Since instruction 4 has not yet completed, the data is tagged and the TID of instruction 4 written into the source blocks of entry 808. As shown in FIG. 9F, no entry is created in the interrupt stack because instruction 6 is an non-interruptible instruction.

The operation of the invention will be described in greater detail with respect to different recovery conditions. One type of recovery condition occurs in the case of a mispredicted branch. Since the outcome of a branch instruction is predicted and the fetch path altered, the expected outcome of the branch, the condition bits being tested, the expected link or count value if used, and the TID tags are saved with the branch instruction queue ("BRQ"). As the required condition code bits and link/count register values become available, instructions in the BRQ are executed and the outcome of each branch resolved. If it is determined that a branch instruction in the BRQ was mispredicted, the associated TID value could be used to index the interrupt stack, select the appropriate entry containing the restart address, and an instruction flush command can be issued to all units and queues to purge logically later instructions along the mispredicted path. Instructions which are logically prior to the branch are unaffected. History buffer entries corresponding to the instructions being flushed are used to restore the TID table to the state at the time of the branch instruction.

Generally, if an interrupt exception occurs, instructions beyond the interrupt point will have already been dispatched and will be in various phases of execution and completion. Thus, there are two cases which must be considered. First, an interrupt associated with the execution of an instruction, and second, an external interrupt. If the interrupt is associated with an instruction, one embodiment of the invention continues instruction processing until the instruction which caused the interrupt becomes the oldest instruction on the interrupt stack. An instruction flush command is then issued to all units and queues for instructions which are logically subsequent to the instruction. History buffer information is used to restore the TID table to the state it would have had prior to the offending instruction if sequential execution was enforced.

In the case of an external interrupt, one preferred embodiment allows the dispatch unit to select an instruction which requires an interrupt stack entry, marking the interrupt stack entry as being associated with the external interrupt. Then the above recovery mechanism is invoked as though the marked instruction took an exception.

According to another embodiment, the invention removes restrictions on load and store ordering to enhance out of order execution gains. In particular, the invention allows execution of instructions which are beyond an instruction whose sources are the subject of a cache miss. Thus, hardware is required to detect a store which is logically prior to a load, is executed after the load, and should affect the data retrieved by the load. Such hardware will, of course, depend on a specific implementation of the processor and is within design capabilities of one skilled in the art in view of the present disclosure. For example, one such mechanism would maintain a queue of all loads which execute prior to the oldest unexecuted store. This "preload" queue would contain the TID of the load, the starting address, and the byte count. During the execution of a store, the mechanism would compare the TID of the store against each of the loads on the preload queue. For each load which is determined to be younger than the store, if there is a byte addressed in common between the store and such a load, then a store-hit-load condition has occurred; the load must get the data which includes the update by the store.

When a store-hit-load occurrence is detected, the TID of the load instruction which caused the exception is used to index the interrupt stack to retrieve the address of the load instruction. An instruction flush command for the load and subsequent instructions is then issued and the TID table is updated with information from the history buffer. Instruction fetching assumes that the address of the load instruction, and instructions which are logically prior to the load, are unaffected.

In another embodiment, hardware is required to detect a store which is logically prior to a load, and where the load executes between the time the store executes and the store data is written to the cache, and should affect the data received by the load. The specific hardware employed is largely a matter of design choice and is within the capabilities of one skilled in the art in view of the present disclosure. For example, one embodiment which allows a store's update of cache to occur after the address generation and translation portion has completed includes a queue of translated addresses for the unwritten stores. Similar to the store-hit-load condition described above, a load-hit-store condition can be detected by comparing the age (TID) of a load at execute against the TID of each store on this translated store queue. For each store queue entry which is determined to be logically prior to the load, if there is a byte addressed in common between the load and the store entry, then a load-hit-store condition has occurred, the load must get the data which includes the update by the store. The circuitry required to perform this check is almost identical to that of the store-hit-load check except in that case a store is compared against a queue of loads while in this case a load is compared against a queue of stores. Note that since the load in execute is flushed if needed, no priority encoder or multiplexer is required to generate the TID for the flush command.

In the case that a load-hit-store occurrence is detected, this version of the invention pursues one of two paths, depending on the availability of the data being loaded. If the data is available in the store data queue, the hardware can access the data from the queue and forward the data as if the load access was a cache hit. If the data is unavailable, then, as in the store-hit-load case, the offending load instruction, and subsequent instructions, are flushed and the history buffer is used to update the TID table. Instruction fetching resumes at the address of the load instruction. Instructions which are logically prior to the load are unaffected in either case.

To avoid serialization associated with summary overflow setting instructions, one embodiment of the invention adds OV-setting instructions to the list of instructions which are allocated in interrupt stack entry. When an instruction which sets OE=1, such as add extended, is executed its OV bit result is saved in the interrupt stack entry associated with the OV-setting instruction. When the entry is being considered for removal from the interrupt stack, the OV result is used to update the architected SO bit. If the SO bit changes, then it is possible that a logically subsequent instruction such as a compare, which is already executed could have the incorrect SO value. Therefore, an instruction flush and TID table update are initiated, eliminating the effects of any subsequent instruction. The OV-setting instruction's interrupt stack entry is used to generate the new fetch address, i.e., the address of the OV-setting instruction plus one instruction length. Of course, instructions which are logically prior to the OV-setting instruction, are unaffected.

In still a further embodiment of the invention, the execution of a STCXW instruction is guessed as being successful. Subsequent instructions to a STCWX are allowed to execute as if the STCXW will set the condition code as "executed successfully". If the guess on the STCWX is incorrect, an instruction flush of instructions dispatched after the STWCX is initiated, eliminating the effects of any subsequent instructions.

In still a further embodiment of the invention, if a deadlock occurs during execution, functionally correct program results can be achieved by adding deadlock cycle counters. If a deadlock is detected, any instruction which has an interrupt to stack entry may be selected and an instruction flush and TID table update are performed, and fetching is resumed with the selected instruction. Various examples of recovery operations will be described in more detail with respect to FIGS. 5A–9R.

In the first example, it will assumed that the instruction completion order is 1, 3, 4 and 5. It will also be assumed that, after instruction 5 completes instruction 2 is found to be a mispredicted branch. In this case, the recovery is illustrated with respect to FIGS. 6G–9I. Referring now to FIGS. 5G–9G, instructions 1 and 3 issue and complete in that order. It will be recalled that the age of the instruction can be determined from its TID value. In this case, when instruction 1 completes, the processor determines that it is older than the oldest entry 900 on the interrupt stack, i.e., TID 2. Thus, history buffer entry 600 is removed from the history buffer. Referring to FIG. 7G, it is seen that instruction 1 is not the most recent setter of GPR 4 in entry 708. Thus, the results of instruction 1 are not written into GPR 4. However, since the results of instruction 1 are required by instruction 4, which is stored in entry 804 of the PEQ, the PEQ snoops the result busses and will update the source blocks of entry 804 when it detects the result of instruction 1 on one of the result busses. This will be discussed in greater detail herein. Since instruction 1 has completed, entry 800 is removed from the PEQ. Since instruction 1 was not an interruptible instruction, no change is made to the interrupt stack shown in FIG. 9G.

Instruction 3 now finishes. Since instruction 3 was a store instruction, and did not write to a GPR register, no changes are made to the history buffer or GPR table. However, PEQ entry 802, corresponding to instruction 3, is removed from the PEQ table as shown in FIG. 8G. Stack entry 902, corresponding to instruction 3, is now marked done by the processor.

Referring now to FIGS. 6H–9H, instruction 4 now issues and executes. Since instruction 4 is newer than instruction 2, it is not removed from the history buffer as shown in FIG. 6H. However, since it is the most recent setter of GPR 4, its results are written into the value field of GPR table entry 708 and the valid/tagged field is set to valid. Referring to FIG. 8H, PEQ entry 804, corresponding to instruction 4, is removed from the PEQ buffer, and an entry 904 of the interrupt stack, instruction 4 is marked done.

Since instruction 4 has now executed and written its value into the GPR table, PEQ entry 808, which is snooping the bus for instruction 4 data, will, when the data is detected, load the value from instruction 4 into the value field of the two source fields, and update the valid/tagged fields to valid.

Upon the completion of instruction 4, instruction 5 issues and executes, according to this example. Since instruction 5 is also older than instruction 2, entry 604 is not removed from the history buffer. However, since instruction 5 is the most recent setter of GPR 2, the results from instruction 5 are written into the value field of GPR entry 704 and the valid/tagged field is updated to valid. Upon completion, entry 806 is removed from the PEQ table, and no change is made to the interrupt stack.

In the above completion example, instruction 2 has yet to be completed. Of course, if instruction 2 completes after instruction 6, and instruction 2 is found to be properly predicted, then no recovery is required, and the processor may continue to execute subsequent instructions.

However, FIGS. 5I–9I illustrate the case where instruction 2 is found to be a mispredicted branch. In this case, entries 602, 604 and 606 of the history buffer as shown in FIG. 6H are used to restore the GPR registers to the state prior to the dispatch of instruction 2. Afterwards, entry 900 in the interrupt stack is used to refetch instruction 2 to restart execution at that point. Finally, the history buffer, PEQ table and interrupt stack are flushed and program execution is restarted at instruction 2. In this case, all GPR entries will have data prior to instruction 2 and are marked valid.

FIGS. 5J–9J provide another illustration where it is assumed that instruction 2 is correctly predicted, the load occurs before the store has reached cache, and the load-hit-store condition is detected before the branch is resolved. In this case, the recovery sequence is similar to that described previously with respect to FIGS. 6I–9I, except refetch begins with instruction 4 whose address is stored in entry 904 of the interrupt stack (see, FIG. 9H) and GPR entries 4, 2 and 3 are restored using entries 602, 604 and 606 of the history buffer. The buffers (except the GPR table) are then flushed beginning with instruction 4. Thus, the state of each buffer will be flushed as shown in FIG. 5J–9J.

Referring now to FIGS. 5K–9N, another illustration of the operation of the invention is described in which it is assumed that the instructions execute in the order of 1, 5, 4, 3 and 6, at which time an exception occurs indicating that the store detects that the load should have waited for store data. FIGS. 5K–9K illustrate the state of the tables after instructions 1 and 5 issue and finish. Since instruction 1 is older than the oldest instruction on the interrupt stack, it is removed from entry 600 in the history buffer. GPR entry 708 is not updated because instruction 4 is the most recent setter of register 4. Entry 800 is removed from the PEQ table, and no change is made to the interrupt stack since instruction 1 is an non-interruptible instruction. Next, instruction 5 executes. Since instruction 5 is newer than instruction 2, entry 604 remains in the history buffer. The results from instruction 5 are written into GPR register 2 and the GPR table is updated to reflect these results and change the value/tagged field to valid. Finally, entry 806 in the PEQ table is removed. Referring again to FIG. 8K, it will be noted that the instructions 1 and 5 are ready for immediate issue and execution because all source data required by the instructions is already valid and thus, no bus snooping is required. It will also be noted that instruction 5 is completely eliminated from the processor. This illustrates one advantage of this embodiment over rename schemes which require a completion buffer and a completion process. Instructions (even interruptible ones) can completely vanish from this processor once they have been executed. Furthermore, unlike rename schemes which keep "intermediate" results in "live" rename registers until their corresponding instruction completes, once an instruction in this processor updates the GPR future file (if the TID matches the most recently dispatched setter) and the instruction queues snoop the result busses, instruction results are instantly discarded—no live rename register is required. Next, instruction 4 issues, executes and writes its results into GPR register 4. This is shown in FIG. 7L where the valid/tagged field is updated to valid and the value field is written with the result from instruction 4 in entry 708. Since instruction 4 is newer than instruction 2, entry 602 remains in the history buffer. Entry 804 is removed from the PEQ buffer and entry 904 in the interrupt stack is marked done.

Next, as shown in FIGS. 5M–9M, instructions 3 and 6 issue and execute. When instruction 3 executes, no change is made to the history buffer because instruction 3 was not a GPR setting instruction. GPR table entry 706 is not updated with the results from instruction 3 because instruction 6 is the most recent setter of that register. Entry 802 is removed from the PEQ buffer.

Upon execution of instruction 6, entry 706 in the GPR table is updated to reflect these results. Entry 808 is removed from the PEQ buffer and entry 906 is marked "done" on the interrupt stack.

At this point, it is assumed that the store instruction 3 detects that a load should have waited for the store data. In this case, the process will then use the history buffer to restore GPR registers 4, 2 and 3 then use interrupt stack entry 904 to perform a refetch of instruction 4. Afterwards, the history buffer, PEQ and interrupt stack are all flushed for instructions having a TID greater than or equal to 4. The status of tables is shown in FIGS. 5N–9N.

In a slightly different illustration, as shown in FIGS. 5O through 9O, the instructions execute in order 1, 5, 4, 3 and 6 and the tables appear as shown in FIGS. 6K–9K initially. Now, it is assumed that instruction 4 issues properly, but add extended instruction 6 detects an overflow error. In this case, no history buffer entries are used to restore the GPR's because there are no entries in the buffer newer than instruction 6. Thus, the processor simply flushes all instructions having a TID greater than or equal to 6, sets the overflow bit, and refetches instruction beyond the add extended instruction 6. More specifically, since the prediction made during the dispatcher of the "ADDEO" instruction was that no overflow occurred, during the execution of the instruction, the real outcome is compared to this predicted outcome. If the predicted outcome was incorrect, a flush results. In this case, the overflow flag (and hence the summary overflow flag) is set, the TID (of the ADDEO instruction)+1 is used to flush the machine, and the ADDEO instruction TID is used to index the interrupt stack, the refetching starts with four bytes (one instruction length) beyond the address of the ADDEO instruction.

With reference to FIGS. 5P–9R, the operation of the invention is illustrated according to an example completion sequence in which instructions 1, 2, 4, 3, 5 and 6 execute in that order. When instruction 1 issues and completes, it is removed from the history buffer. Again, since instruction 4 is more recent, no update is made to the GPR table. Entry 800 is removed from the PEQ table and no change is made to the interrupt stack. When instruction 2 completes, entry 900 on the interrupt stack is marked done. No other changes are made to any other buffers.

Upon execution of instruction 4, GPR table entry 708 is marked valid and updated with the result of instruction 4. As shown in FIGS. 5Q–9Q, entry 804 is removed from the PEQ table and entry 904 in the interrupt stack is marked done. Next, instruction 3 completes. No change is required in the history buffer or GPR table. In the PEQ table, entry 802 is removed and entry 902 is marked done on the interrupt stack as shown in FIG. 9Q. Since instructions 3 and 4 are both marked done on the interrupt stack, instruction 4 is now older than the oldest instruction, i.e., instruction 6 on the stack. Thus, instruction 4 stored in entry 602 is removed from the history buffer. Instruction 5 now executes causing GPR table entry 704 to be updated as shown in FIG. 7Q and entry 806 is removed from the PEQ buffer. Instruction 5 is then removed from the history buffer. Finally, instruction 6 completes. In this case, it is assumed there is no overflow exception. Entry 706 is marked valid and updated with the result of instruction 6. The interrupt stack entry 906 is marked done and history buffer entry 606 is removed from the history buffer table. Entry 808 is removed from the PEQ table, and the state of the processor at this point is indicated in FIGS. 5R–9R.

In another embodiment, the invention allows out-of-order updating of architectural registers. This will be described in greater detail with respect to FIGS. 13–21. Specifically, in processors which implement completion (or re-order) buffers, entries in the completion table would be made for each instruction as it is dispatched. Typically, rename registers would also be assigned for each result-producing instruction to support speculative execution of the instruction. Once an instruction is executed, the result is placed in the associated rename register. The completion unit would check the status of the oldest instruction in the completion table. If the instruction has executed, is known not to cause an exception, and the result is available, the instruction is "completed". This results in the result being copied from the rename register to the general purpose registers (GPRs) which contain the architected version of each GPR. (In some cases, GPRs and renames may exist in the same structure. In that case, there is no explicit copy for the rename register to the GPRs, but there is a logical copy performed by an update of pointers). The completion process would then remove the completed instruction and then logically advance the remaining completion table entries. For example, assuming there is sufficient room in the completion table and sufficient rename registers available, the sequence of six instructions shown in FIG. 13 might be dispatched. For illustration purposes, assume that there was a cache miss for instruction number 1, a load. As a result, instructions 2 and 3 can not progress due to a data dependency. More specifically, the interruptibility of instruction 2 can not be determined until data returns to satisfy the cache miss. However, instructions 4, 5, and 6 can execute, placing their results in the associated, or target, rename registers. Since instruction 2, and in most implementations, instruction 1, does not satisfy the conditions for being removed from the completion table, it and all subsequent instructions remain in the completion table until instruction 2 can execute using the data brought in by the cache miss request. Furthermore, the data for instructions 4, 5, and 6 remains in the rename registers waiting to be copied into the GPRs as these instructions eventually in turn become the oldest instructions in the processor. Depending on the cache miss processing time, dispatch stalls will likely be introduced when either (or both) completion table space or rename registers are exhausted. Furthermore, once the cache miss is resolved and the completion process resumes, restrictions on the rename-to-GPR copy process often introduces other problems which result in additional dispatch stalls.

By contrast, in the present invention, there is no completion table, eliminating the associated dispatch restrictions. FIGS. 14–17 illustrate the state of the GPR table, history buffer table, PEQ table and interrupt stack, respectively, after instructions 1–6 shown in FIG. 13 have been dispatched. The operation of these tables has been described in detail previously, and only points relevant to the present embodiment will be discussed further herein. Referring to FIG. 14, it will be noted that entry 1408, for register 4, is tagged with the TID of instruction 6. Although instructions 2, 4, 5 and 6 all designate register 4 as the architected register, entry 1408 is tagged with instruction 6 because it is the most recent setter of GPR 4.

FIG. 15 shows the history buffer table. Instructions 1, 2 and 3 have all received valid data from the GPR table on dispatch and their value fields contain the contents of registers 2, 4 and 3, respectively, as it existed on dispatch. The TID field is meaningless. Instructions 4, 5 and 6 all received tags from the GPR table.

Referring now to FIG. 16, fields 1600–1610 are updated after the dispatch of instructions 1–6 as shown. In field 1606, it is seen that the source fields for instruction 4 contain valid data from the contents of register 1 and register 0. Thus, instruction 4 is ready to be issued to its appropriate functional unit for execution. FIG. 17 shows the interrupt stack which stores the addresses of instructions 1 and 2 for restart of the processor in the event of an exception.

Since the source registers for instruction 4 are valid, the instruction is issued and executed. Since the execution of instruction 4 can not cause an exception, then the results of instruction 4 are snooped from the result bus by the other tables. Referring now to FIG. 16, it is seen that once the results of instruction 4 are available, instruction 5, in field 1608, is now ready to be issued and executed. Since instruction 5 does not generate an exception, then when its results become available, instruction 6 in field 1610 will be ready to be issued and executed.

Since the execution of instruction 6 can not generate an exception, then the state of the tables will appear as shown in FIGS. 18–21. In FIG. 18, in fields 1400 and 1402, it is seen that registers 0 and 1 are still valid and contain the values which were stored before the sequence. In fields 1404 and 1406, it is seen that registers 2 and 3 are still tagged with TIDs of 1 and 3, respectively. In entry 1408, it is seen that register 4 is now valid and contains the results from the execution of instruction 6. The results of instructions 4 and 5, although having GPR 4 as a destination, were never stored in the GPR table, but were snooped off the bus as required by the other tables. In FIG. 19, it is seen the history buffer still contains only entries 1500, 1502 and 1504 for unexecuted instructions 1–3. Only the result from instruction 6 is kept in GPR 4.

Similarly, the executed instructions are removed from the PEQ table, as shown in FIG. 20, freeing up additional space for the next sequence of instructions. Only unexecuted instructions 2 and 3 in entries 1602 and 1604 remain.

Thus, for the instruction sequence shown in FIG. 13 and execution conditions, even though instructions 2 and 3 have not executed, once instruction 6 begins execution, instructions 4 and 5, and their results, no longer exist in the processor and therefore require no resources. No history buffer entries are required since they are not the first instructions within their interrupt window to set their target register. They require no instruction queue entries since they have already executed and the present invention does not rely on completion tables. Their results do not exist in any history buffer or instruction queue entry since any subsequent instruction which uses GPR 4 will get the result of instruction 6 (or a subsequent instruction).

In processors requiring a completion table, the "lifetime" of instructions in the completion table is from the point of dispatch to the point of completion, where completion here implies all prior instructions has also completed. In the present invention, for most instructions, the lifetime is from dispatch to execution, typically a much shorter interval. For interruptible instructions, the lifetime is from the point of dispatch to the point of being beyond the "interrupt point", which is as soon, but often sooner, than the "completion" point.

Furthermore, with completion tables, speculative results tie up rename registers from dispatch to completion. In the present invention, results logically reside in instruction queues between dispatch and execute, and either disappear after execute, live in the history buffer up to the "interrupt point" if they required copying, or possibly live in instruction queue source fields of dependent instructions until they execute. Shorter lifetimes allow either smaller resource requirements or more aggressive speculation.

While the present invention has been described with respect to the specific embodiments above, it will be understood by those of skill in the art that various changes in form and detail will be apparent to those of skill in the art which are within the scope and spirit of the present invention. All patents, patent applications, and other publications referenced herein are hereby incorporated by reference as though set forth in full.

What is claimed is:

1. A method for maintaining the architectural state of a processor having a set of architectural registers and an architectural register table which includes an entry corresponding to each respective architectural register, the method comprising the steps of:

(a) dispatching an instruction which targets a target architectural register included in the set of architectural registers, the instruction being associated with an identification tag;

(b) upon dispatch of the instruction, writing the identification tag associated with the instruction to a target architectural register table entry corresponding to the target architectural register if the identification tag associated with the instruction is more recent than a prior identification tag stored in the target architectural register table entry;

(c) writing a content record of the target architectural register to an entry in a history buffer table upon dispatch of the instruction;

(d) storing the result from executing the instruction directly to the target architectural register if the identification tag associated with the instruction matches the identification tag stored in the target architectural register table entry at the time the result from executing the instruction becomes available; and (e) storing the result from executing the instruction to an entry in the history buffer table if the identification tag associated with the instruction does not match the identification tag stored in the target architectural register table entry at the time the result from executing the instruction becomes available.

2. The method of claim 1 further comprising the step of:

(a) setting a valid-tagged field in the target architectural register table entry to indicate a tagged status when the identification tag associated with the instruction is written to the target architectural register table entry.

3. The method of claim 1 further comprising the step of:

(a) writing the result from executing the instruction to a value field of the target architectural register table entry.

4. The method of claim 1 further comprising the step of:

(a) setting a valid-tagged field in the target architectural register table entry to indicate a valid status when the result of executing the instruction is written to the target architectural register.

5. The method of claim 1 further comprising the step of:

(a) reading each operand specified in the instruction from one of the set of architectural registers.

6. The method of claim 1 further comprising the step of:

(a) restoring selected information from the history buffer table to the architectural registers in response to an exception in the execution of the instruction.

7. The method of claim 1 further comprising the step of:

(a) determining whether the target register has been written to since the dispatch of the most recent interruptible instruction.

8. The method of claim 1 further comprising the steps of:

(a) storing the identification tag associated with the instruction in a pre-execution queue entry upon dispatch of the instruction; and (b) storing source data for the instruction in the pre-execution queue entry pending execution of the instruction.

9. An apparatus for maintaining the architectural state in a processor having a set of architectural registers and an architectural register table which includes an entry corresponding to each respective architectural register, the apparatus comprising:

(a) a dispatch unit for dispatching an instruction which targets a target architectural register included in the set of architectural registers, the instruction being associated with an identification tag;

(b) an architectural register table tag update arrangement for writing the identification tag associated with the instruction to a target architectural register table entry corresponding to the target architectural register if the identification tag associated with the instruction is more recent than a prior identification tag stored in the target architectural register table entry;

(c) a history buffer value update arrangement for writing a content record of the target architectural register to an entry in a history buffer table upon dispatch of the instruction;

(d) an architectural register update arrangement for storing a result of the instruction directly to the target architectural register if the identification tag associated with the instruction matches the identification tag stored in the target architectural register table entry at the time the result of the instruction becomes available; and (e) a result routing arrangement for storing the result of the instruction to an entry in the history buffer table if the identification tag associated with the instruction does not match the identification tag stored in the target architectural register table entry at the time the result of the instruction becomes available.

10. The apparatus of claim 9 further comprising:

(a) a valid-tagged field update arrangement for setting a valid-tagged field in the target architectural register table entry to indicate a tagged status when the identification tag associated with the instruction is written to the target architectural register table entry.

11. The apparatus of claim 9 further comprising:

(a) a register value update arrangement for writing the result of the instruction to a value field included in the target architectural register table entry.

12. The apparatus of claim 9 further comprising:

(a) a valid-tagged field update arrangement for setting a valid-tagged field in the target architectural register table entry to indicate a valid status when the result of the instruction is written to the target architectural register.

13. The apparatus of claim 9 further comprising:

(a) an operand retrieval arrangement for reading each operand specified in the instruction from one of the set of architectural registers.

14. The apparatus of claim 9 further comprising:

(a) an architectural register state restoring arrangement for restoring selected information from the history buffer table to the architectural registers in response to an exception in the execution of the instruction.

15. The apparatus of claim 9 further comprising:

(a) a history buffer compression arrangement for determining whether the target register has been written to since the dispatch of the most recent interruptible instruction.

16. The apparatus of claim 9 further comprising:

(a) an identification tag routing arrangement for storing the identification tag associated with the instruction in a pre-execution queue entry upon dispatch of the instruction; and (b) a source routing arrangement for storing source data for the instruction in the pre-execution queue entry pending execution of the instruction.

* * * * *